(12) United States Patent
Fukutomi et al.

(10) Patent No.: US 8,549,388 B2
(45) Date of Patent: Oct. 1, 2013

(54) CONTROLLER, STORAGE APPARATUS, AND COMPUTER PROGRAM PRODUCT

(75) Inventors: Kazuhiro Fukutomi, Kanagawa (JP); Hiroshi Yao, Kanagawa (JP); Shinichi Kanno, Tokyo (JP); Shigehiro Asano, Kanagawa (JP); Toshikatsu Hida, Kanagawa (JP); Yasuhiro Kimura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 222 days.

(21) Appl. No.: 13/035,194

(22) Filed: Feb. 25, 2011

(65) Prior Publication Data

US 2012/0072811 A1    Mar. 22, 2012

(30) Foreign Application Priority Data

Sep. 17, 2010 (JP) .................................. 2010-209758

(51) Int. Cl.
*H03M 13/00* (2006.01)
(52) U.S. Cl.
USPC ............................ 714/800; 714/770; 714/766
(58) Field of Classification Search
USPC ......................... 714/800, 766, 805, 770, 42, 5
See application file for complete search history.

(56) References Cited

U.S. PATENT DOCUMENTS

| | | | | |
|---|---|---|---|---|
| 5,235,601 | A | * | 8/1993 | Stallmo et al. ................ 714/766 |
| 5,546,535 | A | * | 8/1996 | Stallmo et al. ............... 714/5.11 |
| 5,634,109 | A | | 5/1997 | Chen et al. |
| 6,148,368 | A | * | 11/2000 | DeKoning ..................... 711/113 |
| 2009/0106255 | A1 | | 4/2009 | Lacapra et al. |
| 2009/0177944 | A1 | | 7/2009 | Kanno |
| 2009/0183052 | A1 | | 7/2009 | Kanno et al. |
| 2009/0240873 | A1 | | 9/2009 | Yu et al. |
| 2009/0327802 | A1 | | 12/2009 | Fukutomi et al. |
| 2009/0327803 | A1 | | 12/2009 | Fukutomi et al. |
| 2010/0223531 | A1 | | 9/2010 | Fukutomi et al. |

FOREIGN PATENT DOCUMENTS

| | | |
|---|---|---|
| EP | 0 690 379 A2 | 1/1996 |
| JP | 9-330185 A | 12/1997 |

OTHER PUBLICATIONS

Office Action issued Nov. 9, 2012, in Korean Patent Application No. 10-2011-0087174 with English translation.
Gun Hyo Baek, et al., "The Study of Performance Enhancement RAID5 Using Parity Shadow Images", Proceedings of Fall Conference on Korean Institute of Information Scientists and Engineers, vol. 20, No. 2 , Nov. 1993, pp. 1045-1048.
U.S. Appl. No. 13/038,804, filed Mar. 2, 2011, Yamamoto, et al.
Extended European Search Report issued Dec. 6, 2011, in Patent Application No. 11179009.3.

(Continued)

*Primary Examiner* — Fritz Alphonse
(74) *Attorney, Agent, or Firm* — Oblon, Spivak, McClelland, Maier & Neustadt, L.L.P.

(57) ABSTRACT

According to one embodiment, a controller controls writing into and reading from a storage apparatus that includes a first data-storage unit and a second data-storage unit. The second data-storage unit stores user data and parity data of the user data. The first data-storage unit stores the parity data. The controller includes a parity updating unit and a parity writing unit. When parity data is updated, the parity updating unit writes the updated parity data into the first data-storage unit. When a certain requirement is satisfied, the parity writing unit reads the parity data written in the first data-storage unit, and writes the parity data thus read into the second data-storage unit.

9 Claims, 15 Drawing Sheets

(56) References Cited

OTHER PUBLICATIONS

Office Action issued Jul. 10, 2012 in Japanese Patent Application No. 2010-209758 (with English-language translation).
U.S. Appl. No. 13/218,812, filed Aug. 26, 2011, Fukutomi, et al.
U.S. Appl. No. 13/601,107, filed Aug. 31, 2012, Hida, et al.
U.S. Appl. No. 12/885,962, filed Sep. 20, 2010, Kenichiro Yoshii, et al.
U.S. Appl. No. 12/889,018, filed Sep. 23, 2010, Shinichi Kanno.
U.S. Appl. No. 12/887,875, filed Sep. 22, 2010, Toshikatsu Hida, et al.
U.S. Appl. No. 12/888,822, filed Sep. 23, 2010, Shigehiro Asano, et al.
David A Patterson, et al., "A Case for Redundant Arrays of Inexpensive Disks (RAID)", Proceedings of the 1988 ACM SIGMOD, Jun. 1988, pp. 109-116.
U.S. Appl. No. 13/824,542, filed Mar. 18, 2013, Watanabe et al.

\* cited by examiner

IDENTIFIER OF STORAGE AREA

CONTROLLER, STORAGE APPARATUS, AND COMPUTER PROGRAM PRODUCT

CROSS-REFERENCE TO RELATED APPLICATIONS

This application is based upon and claims the benefit of priority from Japanese Patent Application No. 2010-209758, filed on Sep. 17, 2010; the entire contents of which are incorporated herein by reference.

FIELD

Embodiments described herein relate generally to a controller, a storage apparatus, and a computer program product.

BACKGROUND

A data storage apparatus is required to have high reliability. By applying a configuration such as that of Redundant Arrays of Inexpensive Disks (RAID) 5, the data storage apparatus can execute recovery of data. Accordingly, reliability of a storage system as a whole that combines a plurality of data storage apparatuses can be improved.

However, according to conventional technologies, although the reliability of a storage system as a whole that combines a plurality of data storage apparatuses can be improved, reliability of a data storage apparatus as a single apparatus cannot be improved.

DETAILED DESCRIPTION

Figure 1:
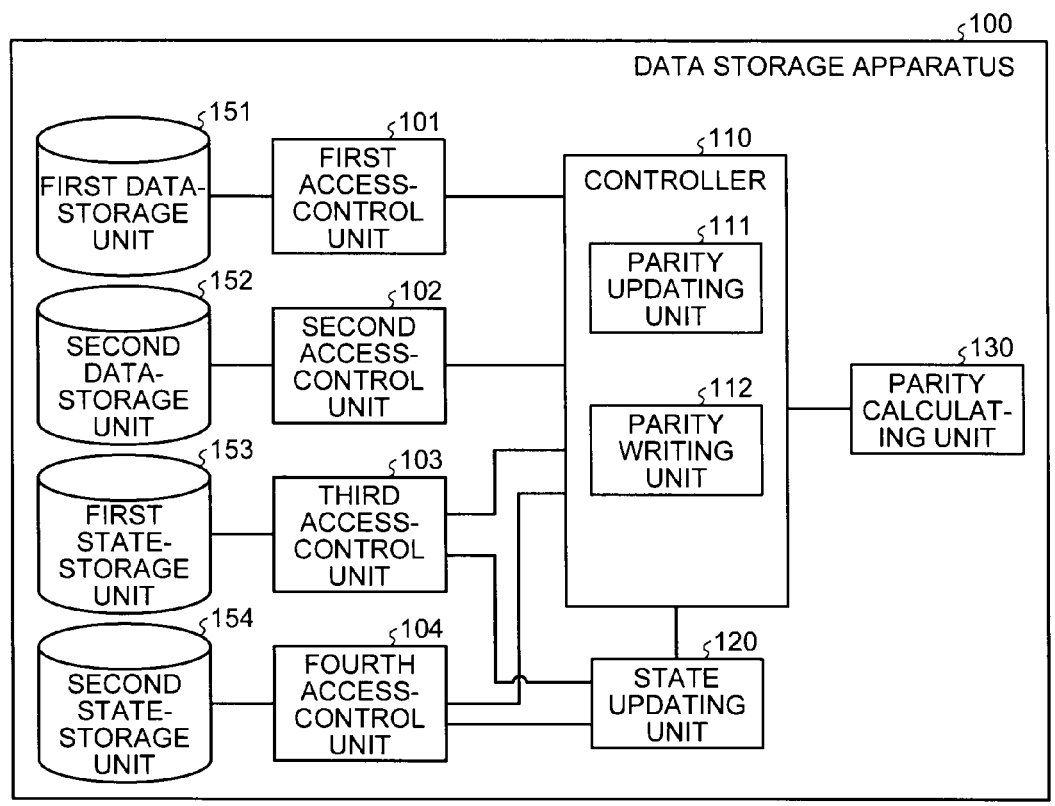
FIG. 1 is a functional block diagram of a data storage apparatus according to a first embodiment.

In general, according to one embodiment, a controller controls writing into and reading from a storage apparatus that includes a first data-storage unit and a second data-storage unit. The second data-storage unit stores user data and parity data of the user data. The first data-storage unit stores parity data. The controller includes a parity updating unit and a parity writing unit. When parity data is updated, the parity updating unit writes the updated parity data into the first data-storage unit. When a certain requirement is satisfied, the parity writing unit reads the parity data written in the first data-storage unit, and writes the parity data thus read into the second data-storage unit.

Exemplary embodiments of a data storage apparatus will be explained below in detail with reference to the accompanying drawings.

First Embodiment

To improve reliability of a single apparatus of a data storage apparatus (hereinafter, "data storage apparatus") according to a first embodiment, the data storage apparatus is configured to include therein a structure such as that of a Redundant Array of Inexpensive Disk (RAID) 5 (described in D. Patterson, G. Gibson, and R. Katz, "A Case for Redundant Arrays of Inexpensive Disks (RAID)", Proceedings of the 1988 ACM SIGMOD, pp. 109-116, June 1988), to achieve data recovery in the data storage apparatus.

Data storage apparatuses are also required to reduce costs. A storage medium of which the price-to-capacity ratio is relatively inexpensive is often used. Such a storage medium of which the price-to-capacity ratio is relatively inexpensive often has a relatively slow speed of data-writing.

When the data storage apparatus employs a configuration such as that of RAID 5, the writing amount of data-recovery code (hereinafter, "parity") data becomes large, compared with the writing amount of user data, of which writing is requested by a host device, onto a storage medium. Because there is an upper limit in a data-writing speed band onto the storage medium itself in the data storage apparatus, when the data storage apparatus employs a configuration such as that of RAID 5, a disadvantage that the writing speed of user data becomes slow arises as a consequence.

Some storage medium, such as a NAND type flash memory, is said that a product life of storage elements included in the storage medium varies depending on the number of times of rewriting data. In a data storage apparatus using such storage medium, there is a disadvantage that when the writing amount of parity data becomes large, a design life of the data storage apparatus becomes short.

Because of circumstances described above, when the data storage apparatus employs a configuration such as that of RAID 5, it is required to reduce the writing amount of parity data onto a storage medium, compared with the writing amount of user data onto the storage medium.

Therefore, the embodiment includes a storage medium that stores only parity data (first data-storage unit) in addition to a storage medium that stores user data and parity data (second data-storage unit). When updating the parity data, the first data-storage unit stores the updated parity data, and then the parity data stored in the first data-storage unit is written into the second data-storage unit at certain timing. Accordingly, compared with the writing amount of user data onto a storage medium, the writing amount of parity data onto the storage medium can be reduced.

FIG. 1 is a functional block diagram that depicts a configuration example of a data storage apparatus 100 according to the first embodiment. As shown in FIG. 1, the data storage apparatus 100 includes a first data-storage unit 151, a first access-control unit 101, a second data-storage unit 152, a second access-control unit 102, a first state-storage unit 153, a third access-control unit 103, a second state-storage unit 154, a fourth access-control unit 104, a state updating unit 120, a controller 110, and a parity calculating unit 130. The controller 110 includes a parity updating unit 111 and a parity writing unit 112.

Figure 2:
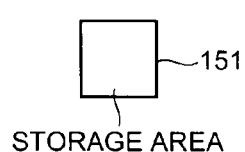
FIG. 2 is a schematic diagram of a configuration example of a first data-storage unit.

The first data-storage unit 151 includes at least one storage area, as shown in FIG. 2. Each storage area stores therein parity data. The first data-storage unit 151 may include a plurality of storage areas, and each of the storage areas may store therein parity data. In other words, the data storage apparatus 100 may have a plurality of parity groups. The parity group means an aggregation of storage areas that store therein user data protected by certain parity data. The data storage apparatus 100 has, when it has a plurality of parity groups, a plurality of pieces of various information explained later in accordance with the number of parity groups. When the data storage apparatus 100 has a plurality of parity groups, configurations and processes described below may be provided in accordance therewith.

The first access-control unit 101 controls reading or writing into the first data-storage unit 151.

Figure 3:
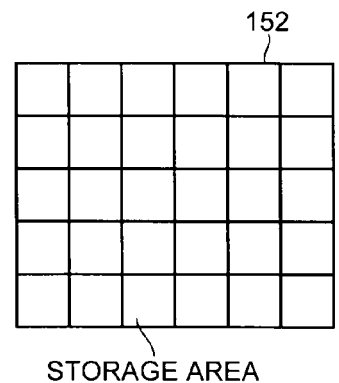
FIG. 3 is a schematic diagram of a configuration example of a second data-storage unit.

The second data-storage unit 152 includes a plurality of storage areas, as shown in FIG. 3. Each storage area stores therein user data or parity data. Among the storage areas, a storage area storing user data has two states, namely, a first state and a second state. The first state is a state that user data stored in the storage area is protected by parity data stored by the first data-storage unit 151. The second state is a state that user data stored in the storage area is not protected by parity data stored by the first data-storage unit 151.

The second access-control unit 102 controls reading or writing into the second data-storage unit 152.

The second data-storage unit 152 may be configured to be relatively inferior to the first data-storage unit 151 in terms of properties. For example, the data writing speed of the second data-storage unit 152 may be relatively inferior to the first data-storage unit 151. In another case where the second data-storage unit 152 includes storage elements of which life depends on the number of times of data writing, the second data-storage unit 152 may be relatively inferior to the first data-storage unit 151 in terms of the number of times in data-writing durability. In still another case where the second data-storage unit 152 includes storage elements of which data writing speed is relatively inferior to the data reading speed, the second data-storage unit 152 may be relatively inferior to the first data-storage unit 151 in terms of a degree of inferiority of the data writing speed to the data reading speed. Examples of properties are not limited to these examples.

Figure 4:
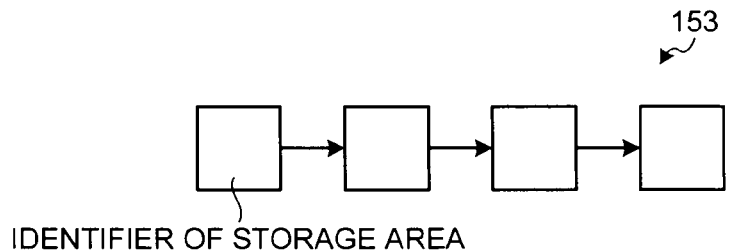
FIG. 4 is a schematic diagram of a configuration example of a first state-storage unit.

The first state-storage unit 153 stores therein first-state aggregation information. The first-state aggregation information is information (identification information) that identifies an aggregation of storage areas in the first state (first-state aggregation) among storage areas included in the second data-storage unit 152. The first-state aggregation information may be formed, for example, by a list structure of identifiers of storage areas, as shown in FIG. 4.

The third access-control unit 103 controls access to the first state-storage unit 153. The access to the first state-storage unit 153 includes reading of first-state aggregation information stored by the first state-storage unit 153, addition of storage area information designated by a request source to the first aggregation information stored by the first state-storage unit 153, and deletion of storage area information designated by the request source from the first aggregation information stored by the first state-storage unit 153.

Figure 5:
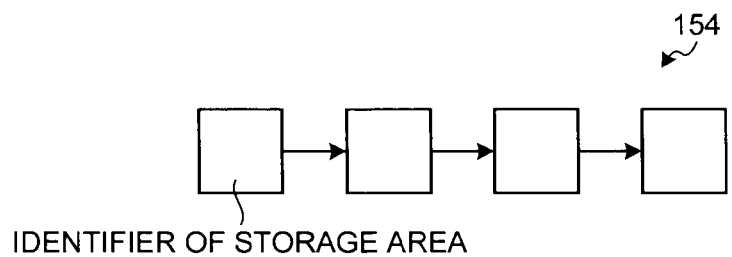
FIG. 5 is a schematic diagram of a configuration example of a second state-storage unit.

The second state-storage unit 154 stores therein second-state aggregation information. The second-state aggregation information is information that identifies an aggregation of storage areas in the second state (second-state aggregation) among storage areas included in the second data-storage unit 152. The second-state aggregation information may be formed, for example, by a list structure of identifiers of storage areas, as shown in FIG. 5.

The fourth access-control unit 104 controls access to the second state-storage unit 154. The access to the second state-storage unit 154 includes reading of second-state aggregation information stored by the second state-storage unit 154, addition of storage area information designated by a request source to the second aggregation information stored by the second state-storage unit 154, and deletion of storage area information designated by the request source from the second aggregation information stored by the second state-storage unit 154.

The parity calculating unit 130 performs parity calculation on a plurality of input data received from an instruction source, and returns a calculation result to the instruction source. The parity calculation is a calculation to be executed when creating parity data, updating parity data, recovering data, and the like, and includes operations, for example, an exclusive OR operation. Although an example of using an exclusive OR operation as a parity calculation is explained below, applicable parity calculations are not limited to this. Moreover, the parity calculating unit 130 can be configured to be provided outside the data storage apparatus 100.

The state updating unit 120 instructs the fourth access-control unit 104 to read second-state aggregation information stored by the second state-storage unit 154, and acquires the second-state aggregation information, as required. The state updating unit 120 selects a storage area to be changed to the first state from an aggregation of storage areas indicated by the acquired second-state aggregation information (second-state aggregation), and notifies the parity updating unit 111 of identification information about the selected storage area.

Moreover, the state updating unit 120 instructs the third access-control unit 103 to read first-state aggregation information stored by the first state-storage unit 153, and acquires the first-state aggregation information, as required. The state updating unit 120 selects a storage area to be changed to the second state from an aggregation of storage areas indicated by the acquired first-state aggregation information (first-state aggregation), and notifies the parity updating unit 111 of identification information about the selected storage area.

When identification information about a storage area to be changed to the first state is notified from the state updating unit 120, the parity updating unit 111 instructs the second access-control unit 102 to read data stored by the notified storage area, and acquires the data stored by the notified storage area. The parity updating unit 111 instructs the first access-control unit 101 to read parity data recorded in the first data-storage unit 151, and acquires the parity data recorded in the first data-storage unit 151. The parity updating unit 111 instructs the parity calculating unit 130 to perform parity calculation on the acquired parity data and the acquired data stored by the storage area, and acquires updated parity data. The parity updating unit 111 instructs the first access-control unit 101 to write the acquired updated parity data into the first data-storage unit 151. The parity updating unit 111 instructs the fourth access-control unit 104 to delete identification information about the notified storage area from the second-state aggregation information stored by the second state-storage unit 154. The parity updating unit 111 instructs the third access-control unit 103 to add identification information about the notified storage area to the first-state aggregation information stored by the first state-storage unit 153.

When identification information about a storage area to be changed to the second state is notified from the state updating unit 120, the parity updating unit 111 instructs the second access-control unit 102 to read data stored by the notified storage area, and acquires the data stored by the notified storage area. The parity updating unit 111 instructs the first access-control unit 101 to read parity data recorded in the first data-storage unit 151, and acquires the parity data recorded in the first data-storage unit 151. The parity updating unit 111 instructs the parity calculating unit 130 to perform parity calculation on the acquired parity data and the acquired data stored by the storage area, and acquires updated parity data. The parity updating unit 111 instructs the first access-control unit 101 to write the acquired updated parity data into the first data-storage unit 151. The parity updating unit 111 instructs the third access-control unit 103 to delete identification information about the notified storage area from the first-state aggregation information stored by the first state-storage unit 153. The parity updating unit 111 instructs the fourth access-control unit 104 to add identification information about the notified storage area to the second-state aggregation information stored by the second state-storage unit 154.

As described above, the state updating unit 120 notifies the parity updating unit 111 of a notice to change a storage area in the second state to the first state, and a notice to change a storage area in the first state to the second state, separately. Moreover, the parity updating unit 111 updates parity data separately with respect to the notice to change a storage area in the second state to the first state, and the notice to change a storage area in the first state to the second state, the notices being from the state updating unit 120.

Accordingly, the number of storage areas that store user data protected by parity data can be dynamically changed. In other words, the number of storage areas included in a parity group can be dynamically changed.

The parity writing unit 112 instructs the first access-control unit 101 to read parity data recorded in the first data-storage unit 151 at certain timing that is preliminarily or dynamically determined, and acquires the parity data recorded in the first data-storage unit 151. The parity writing unit 112 then instructs the second access-control unit 102 to write the acquired parity data into the second data-storage unit 152.

The certain timing that is preliminarily or dynamically determined means, for example, timing when a predetermined requirement is satisfied. As a requirement, for example, each time when a certain period elapses, or timing when the number of times of updating of parity data exceeds a certain number, or the like, any requirement can be applied.

Hereinafter, "to instruct the first access-control unit 101 to read parity data recorded in the first data-storage unit 151, to acquire the parity data recorded in the first data-storage unit 151, and to instruct the second access-control unit 102 to write the acquired parity data into the second data-storage unit 152", are referred to as a parity writing instruction, as required.

As described above, the parity updating unit 111 updates parity data on the first data-storage unit 151. Moreover, the parity writing unit 112 writes parity data on the first data-storage unit 151 into the second data-storage unit 152 at certain timing that is preliminarily or dynamically determined, independently from the parity-data updating process on the first data-storage unit 151. Therefore, updated parity data is not to be written into the second data-storage unit 152 each time the parity updating process is performed.

When the first data-storage unit 151 and the second data-storage unit 152 have the above-described properties of memory, a degree of deterioration in performance and a degree of decrease in life as the whole of the data storage apparatus 100 can be suppressed by reducing the writing into the second data-storage unit 152. As described above, because updated parity data is not to be written into the second data-storage unit 152 each time the parity updating process is performed, according to the embodiment, the writing into the second data-storage unit 152 can be reduced. Therefore, according to the embodiment, a degree of deterioration in performance and a degree of decrease in life as the whole of the data storage apparatus 100 can be suppressed.

According to the embodiment, rewriting of user data is permitted only to a storage area in the second state. Therefore, for example, when a need to rewrite user data stored in a storage area in the first state and to maintain the first state also after the user data is rewritten arises; a procedure is to be followed such that, for example, the state updating unit 120 makes an instruction to change the storage area once to the second state, a not-shown user-data rewriting unit instructs the second access-control unit 102 to rewrite the user data in the storage area, and the state updating unit 120 makes an instruction to change the storage area to the first state.

Within a scope not departing from the object of the embodiment, a series of the processes described above can be combined and optimized, and for example, the number of times of reading data from the second data-storage unit 152 can be reduced. This applies to embodiments described below. For example, a case is considered in which data A in the second data-storage unit 152 is changed to data A', and parity data is updated along with the change. According to a method without optimization, changed data A' is stored into the second data-storage unit 152, and then the stored data A' needs to be read from the second data-storage unit 152 in order to update parity data. In this case, the number of times of reading data from the second data-storage unit 152 can be reduced by storing changed data A' into a temporary storage unit, such as a Random Access Memory (RAM), and then using the data A' stored in the temporary storage unit when updating parity data.

Figure 6:
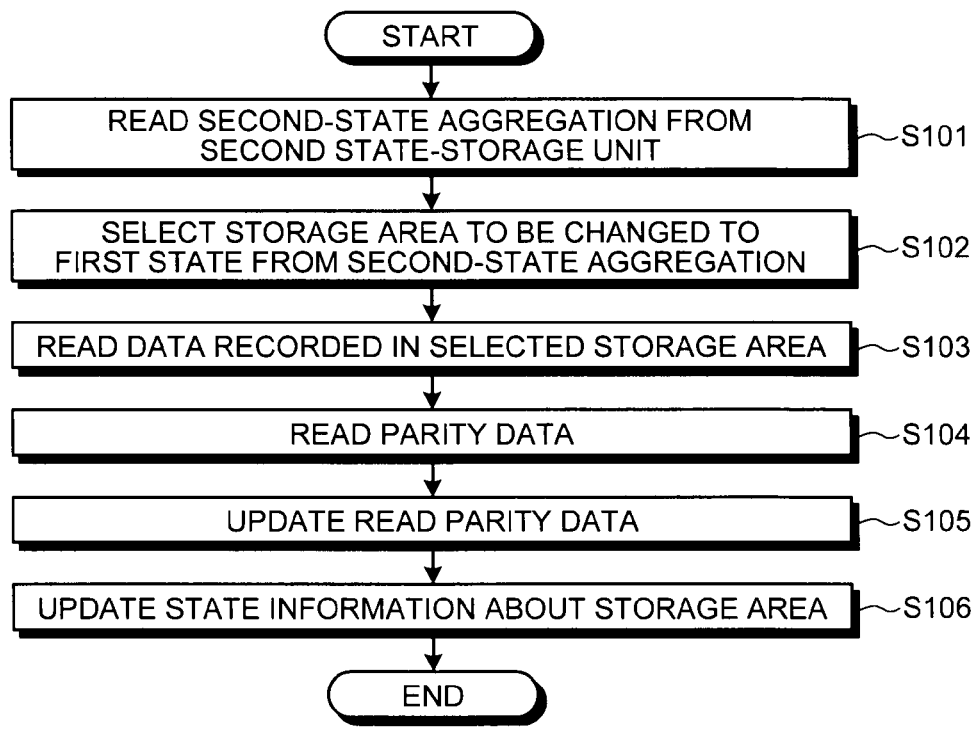
FIG. 6 is a flowchart of a process of changing a storage area to a first state according to the first embodiment.

The process performed by the data storage apparatus 100 according to the first embodiment thus configured is explained below with reference to FIG. 6. FIG. 6 is a flowchart that depicts a flow of a process of changing a storage area to the first state according to the first embodiment.

To begin with, the state updating unit 120 reads a second-state aggregation from the second state-storage unit 154 as required (Step S101). Specifically, the state updating unit 120 instructs the fourth access-control unit 104 to read second-state aggregation information stored by the second state-storage unit 154. The fourth access-control unit 104 reads the second-state aggregation information stored by the second state-storage unit 154, and outputs to the state updating unit 120. The state updating unit 120 acquires the second-state aggregation information. The state updating unit 120 selects a storage area to be changed to the first state from an aggregation of storage areas indicated by the acquired second-state aggregation information, and notifies the parity updating unit 111 of identification information about the selected storage area (Step S102).

The parity updating unit 111 reads data recorded in the storage area to be changed to the first state (Step S103). Specifically, when identification information about a storage area to be changed to the first state is notified from the state updating unit 120, the parity updating unit 111 instructs the second access-control unit 102 to read data stored by the notified storage area. The second access-control unit 102 reads the data stored by the notified storage area, and outputs to the parity updating unit 111. The parity updating unit 111 acquires the data stored by the notified storage area.

The parity updating unit 111 reads parity data from the first data-storage unit 151 (Step S104). Specifically, the parity updating unit 111 instructs the first access-control unit 101 to read parity data recorded in the first data-storage unit 151. The first access-control unit 101 reads the parity data recorded in the first data-storage unit 151, and outputs to the parity updating unit 111. The parity updating unit 111 acquires the parity data recorded in the first data-storage unit 151.

The parity updating unit 111 updates the acquired parity data (Step S105). Specifically, the parity updating unit 111 instructs the parity calculating unit 130 to perform parity calculation on the acquired parity data and the acquired data stored by the storage area. The parity calculating unit 130 performs parity calculation on a plurality of input data received from the instruction source, and returns a calculation result to the instruction source. The parity calculation is a calculation to be executed when creating or updating parity data, recovering data, or the like, and includes operations, for example, an exclusive OR operation. The parity updating unit 111 acquires updated parity data. The parity updating unit 111 instructs the first access-control unit 101 to write the acquired updated parity data into the first data-storage unit 151. The first access-control unit 101 writes the updated parity data into the first data-storage unit 151.

The parity updating unit 111 updates the state information about the storage area (Step S106). Specifically, the parity updating unit 111 instructs the fourth access-control unit 104 to delete the identification information about the notified storage area from the second-state aggregation information stored by the second state-storage unit 154. The fourth access-control unit 104 deletes the identification information about the storage area notified to the parity updating unit 111, from the second-state aggregation information stored by the second state-storage unit 154. The parity updating unit 111 instructs the third access-control unit 103 to add the identification information about the notified storage area into the first-state aggregation information stored by the first state-storage unit 153. The third access-control unit 103 adds the identification information about the storage area notified to the parity updating unit 111 into the first-state aggregation information stored by the first state-storage unit 153.

Figure 7:
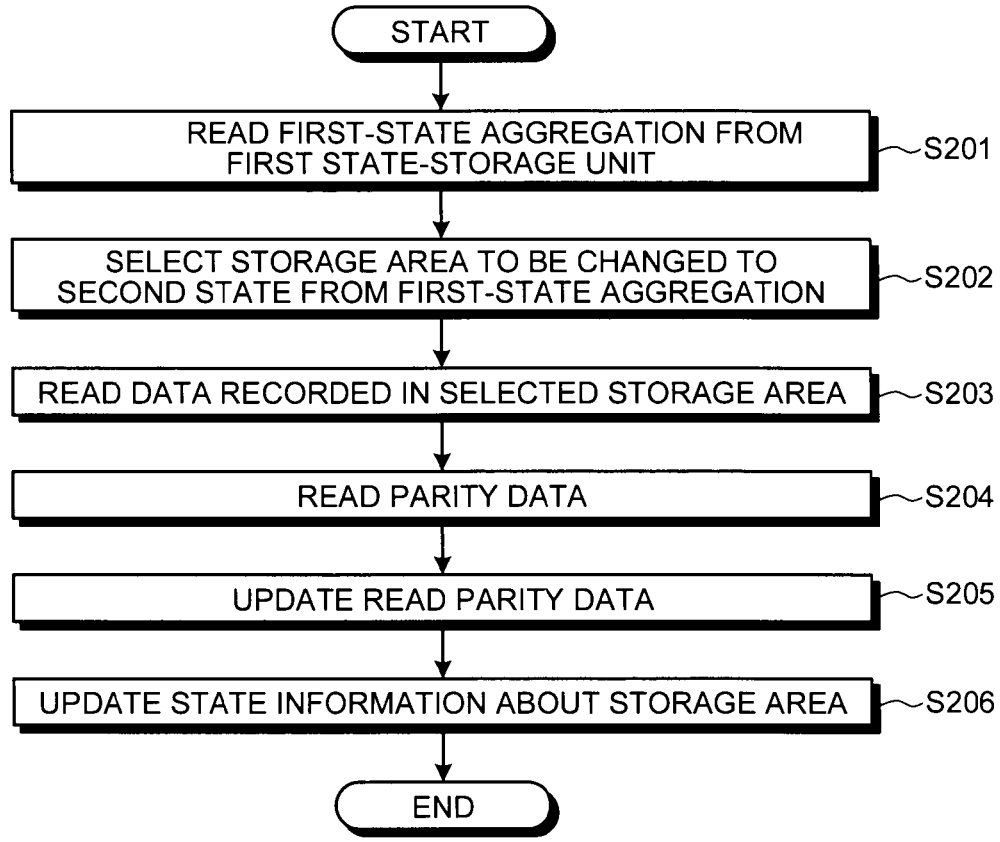
FIG. 7 is a flowchart of a process of changing a storage area to a second state according to the first embodiment.

An example of a process procedure of changing a storage area to the second state is then explained below with reference to FIG. 7. FIG. 7 is a flowchart that depicts a flow of a process of changing a storage area to the second state according to the first embodiment.

To begin with, the state updating unit 120 reads a first-state aggregation from the first state-storage unit 153 as required (Step S201). Specifically, the state updating unit 120 instructs the third access-control unit 103 to read first-state aggregation information stored by the first state-storage unit 153. The third access-control unit 103 reads the first-state aggregation information stored by the first state-storage unit 153, and outputs to the state updating unit 120. The state updating unit 120 acquires the first-state aggregation information. The state updating unit 120 selects a storage area to be changed to the second state from an aggregation of storage areas indicated by the acquired first-state aggregation information, and notifies the parity updating unit 111 of identification information about the selected storage area (Step S202).

The parity updating unit 111 reads data recorded in the storage area to be changed to the second state (Step S203). Specifically, when identification information about a storage area to be changed to the second state is notified from the state updating unit 120, the parity updating unit 111 instructs the second access-control unit 102 to read data stored by the notified storage area. The second access-control unit 102 reads the data stored by the notified storage area, and outputs to the parity updating unit 111. The parity updating unit 111 acquires the data stored by the notified storage area.

The parity updating unit 111 then reads parity data (Step S204), and updates the read parity data (Step S205). This process is the same as the process at Steps S104 and S105 in FIG. 6, therefore detailed explanation is omitted.

The parity updating unit 111 updates the state information about the storage area (Step S206). Specifically, the parity updating unit 111 instructs the third access-control unit 103 to delete the identification information about the notified storage area from the first-state aggregation information stored by the first state-storage unit 153. The third access-control unit 103 deletes the identification information about the storage area notified to the parity updating unit 111, from the first-state aggregation information stored by the first state-storage unit 153. The parity updating unit 111 instructs the fourth access-control unit 104 to add the identification information about the notified storage area into the second-state aggregation information stored by the second state-storage unit 154. The fourth access-control unit 104 adds the identification information about the storage area notified to the parity updating unit 111 into the second-state aggregation information stored by the second state-storage unit 154.

Figure 8:
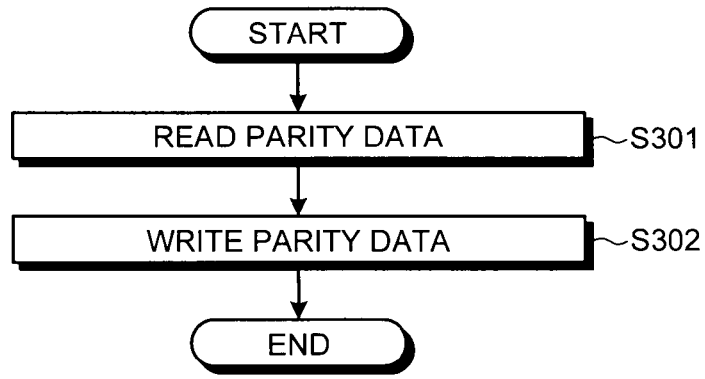
FIG. 8 is a flowchart of a parity writing process according to the first embodiment.

An example of a process procedure of parity writing is then explained below with reference to FIG. 8. FIG. 8 is a flowchart that depicts a flow of a parity writing process according to the first embodiment.

To begin with, the parity writing unit 112 reads parity data from the first data-storage unit 151 (Step S301). Specifically, the parity writing unit 112 instructs the first access-control unit 101 to read parity data recorded in the first data-storage unit 151 at certain timing that is preliminarily or dynamically determined. The first access-control unit 101 reads the parity data recorded in the first data-storage unit 151, and outputs to the parity writing unit 112. The parity writing unit 112 acquires the parity data recorded in the first data-storage unit 151.

The parity writing unit 112 writes the acquired parity data (Step S302). Specifically, the parity writing unit 112 instructs the second access-control unit 102 to write the acquired parity data into the second data-storage unit 152. The second access-control unit 102 writes the parity data acquired by the parity writing unit 112 into the second data-storage unit 152.

In this way, the data storage apparatus according to the first embodiment can reduce the writing amount of parity data onto a storage medium, compared with the writing amount of user data onto the storage medium.

Second Embodiment

In a data storage apparatus according to a second embodiment, parity data is written into the second data-storage unit 152 from the first data-storage unit 151, each time when the number of storage areas changed to the second state exceeds a threshold that is determined preliminarily or dynamically.

Figure 9:
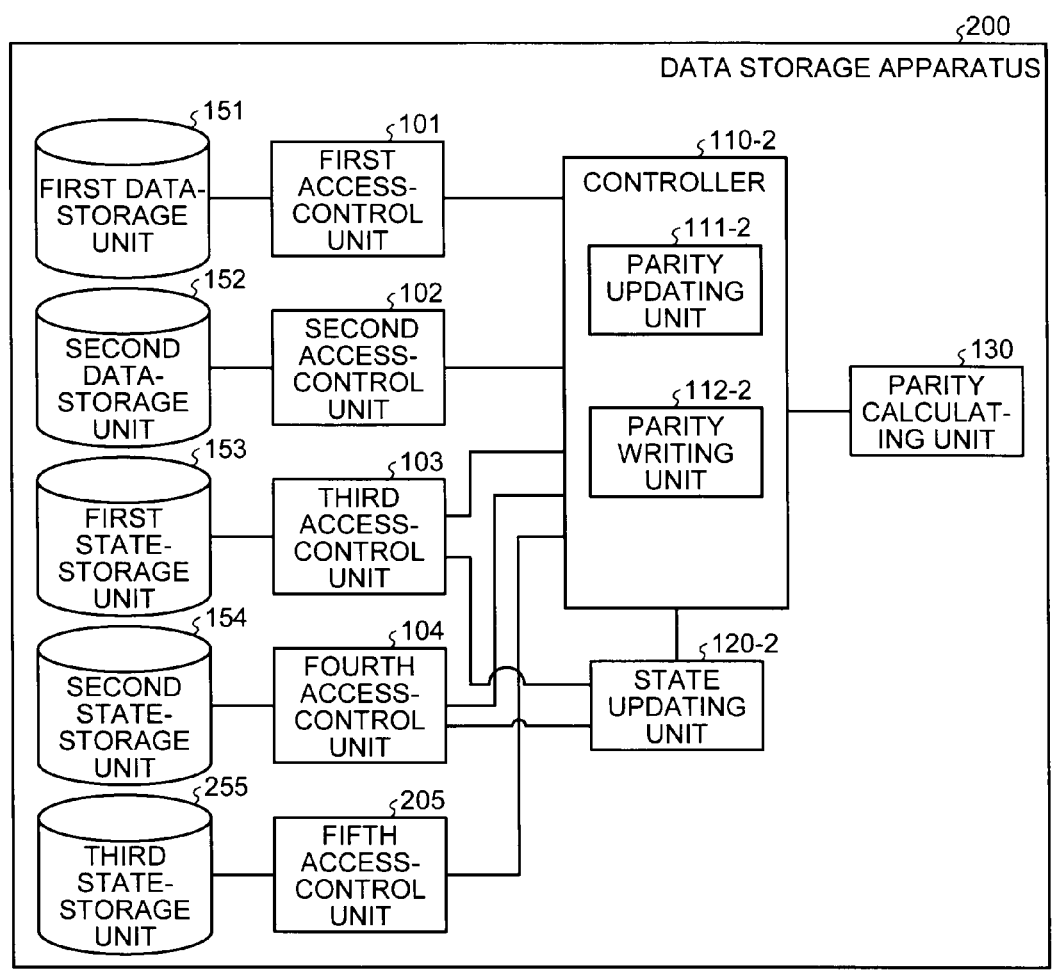
FIG. 9 is a functional block diagram of a data storage apparatus according to a second embodiment.

FIG. 9 is a functional block diagram of a configuration example of a data storage apparatus 200 according to the second embodiment. As shown in FIG. 9, the data storage apparatus 200 includes the first data-storage unit 151, the first access-control unit 101, the second data-storage unit 152, the second access-control unit 102, the first state-storage unit 153, the third access-control unit 103, the second state-storage unit 154, the fourth access-control unit 104, the parity calculating unit 130, a state updating unit 120-2, a controller 110-2, a third state-storage unit 255, and a fifth access-control unit 205. The controller 110-2 includes a parity updating unit 111-2 and a parity writing unit 112-2. The same units as the already-explained functional units are assigned with the same reference numerals, and detailed explanations are omitted.

The third state-storage unit 255 stores additional second-state aggregation information. An aggregation of storage areas in the second state indicated by the second-state aggregation information stored by the second state-storage unit 154 includes the following two aggregations.

(1) An aggregation of storage areas that have been in the second state continuously since before the latest moment when the parity writing unit 112-2 described later instructs the first access-control unit 101 and the second access-control unit 102 to write parity data recorded in the first data-storage unit 151 into the second data-storage unit 152 (hereinafter, referred to as the latest parity-writing moment).

(2) An aggregation of storage areas that are selected by the state updating unit 120-2 described later from an aggregation of storage areas indicated by the first-state aggregation information as storage areas to be changed to the second state, and resultantly turned to the second state, after the latest parity-writing moment.

Figure 10:
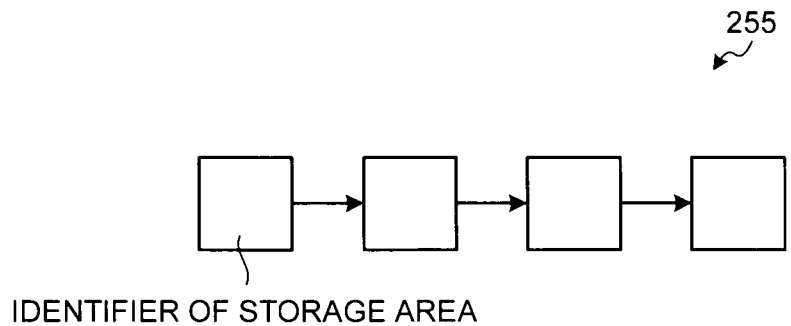
FIG. 10 is a schematic diagram of a configuration example of a third state-storage unit.

The additional second-state aggregation information is information about an aggregation of storage areas that are turned to the second state after the latest parity-writing moment (additional second-state aggregation). The additional second-state aggregation information is formed by a list structure of identifiers of storage areas, for example, as shown in FIG. 10.

The fifth access-control unit 205 controls access to the third state-storage unit 255. The access to the third state-storage unit 255 includes reading of additional second-state aggregation information stored by the third state-storage unit 255, addition of storage area information designated by a request source to the additional second-state aggregation information stored by the third state-storage unit 255, deletion of storage area information designated by the request source from the additional second-state aggregation information stored by the third state-storage unit 255, and deletion of the additional second-state aggregation information stored by the third state-storage unit 255.

The state updating unit 120-2 is similar to the state updating unit 120 according to the first embodiment, except that the notice destination is the parity updating unit 111-2 instead of the parity updating unit 111, therefore detailed explanation is omitted.

The parity updating unit 111-2 is similar to the parity updating unit 111, except that regarding the process when identification information about a storage area to be changed to the first state is notified from the state updating unit 120-2, the notice source is the state updating unit 120-2 instead of the state updating unit 120, therefore detailed explanation is omitted.

When identification information about a storage area to be changed to the second state is notified from the state updating unit 120-2, the parity updating unit 111-2 instructs the fifth access-control unit 205 to add the identification information about the notified storage area into the additional second-state aggregation information stored by the third state-storage unit 255, in addition to performing the process that is performed when the parity updating unit 111 is notified of identification information about a storage area to be changed to the second state from the state updating unit 120.

The parity writing unit 112-2 instructs the fifth access-control unit 205 to read the additional second-state aggregation information stored by the third state-storage unit 255, and acquires the additional second-state aggregation information stored by the third state-storage unit 255. The parity writing unit 112-2 obtains the number of pieces of identification information about a storage area (hereinafter, referred to as area information) included in the acquired additional second-state aggregation information. When the number of pieces of the obtained area information exceeds a threshold that is preliminarily or dynamically determined, the parity writing unit 112-2 instructs the fifth access-control unit 205 to delete the additional second-state aggregation information stored by the third state-storage unit 255, in addition to the parity writing instruction given by the parity writing unit 112.

Figure 11:
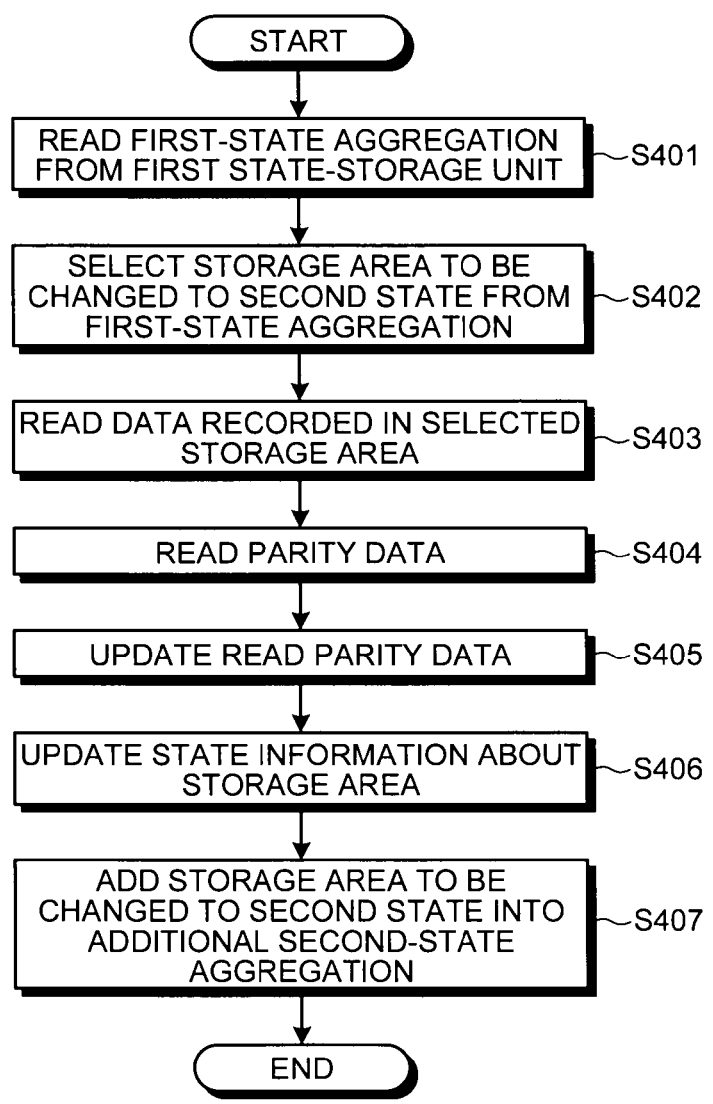
FIG. 11 is a flowchart of a process of changing a storage area to the second state according to the second embodiment.

The process performed by the data storage apparatus 200 according to the second embodiment thus configured is explained below with reference to FIG. 11. A flow of a process of changing a storage area to the first state is similar to FIG. 6 according to the first embodiment, therefore explanation is omitted. FIG. 11 is a flowchart that depicts a flow of a process of changing a storage area to the second state according to the second embodiment.

Steps S401 to S406 are processes similar to the processes at Steps S201 to S206 by the data storage apparatus 100 according to the first embodiment, therefore, explanations of them are omitted.

At Step S407, the parity updating unit 111-2 adds the identification information about the storage area to be changed to the second state into the additional second-state aggregation information. Specifically, the parity updating unit 111-2 instructs the fifth access-control unit 205 to add the identification information about the storage area notified from the state updating unit 120-2, into the additional second-state aggregation information stored by the third state-storage unit 255. The fifth access-control unit 205 adds the identification information about the storage area that is notified to the parity updating unit 111-2 from the state updating unit 120-2, into the additional second-state aggregation information stored by the third state-storage unit 255.

Figure 12:
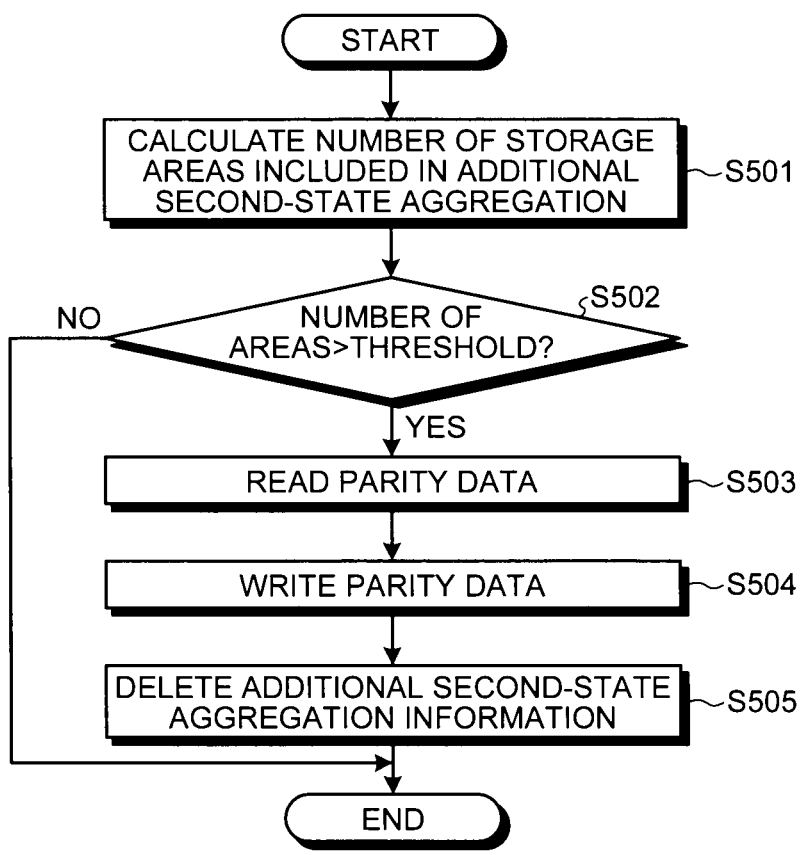
FIG. 12 is a flowchart of a parity writing process according to the second embodiment.

An example of a process procedure of parity writing is then explained below with reference to FIG. 12. FIG. 12 is a flowchart that depicts a flow of a parity writing process according to the second embodiment.

To begin with, the parity writing unit 112-2 obtains the number of pieces of area information included in additional second-state aggregation information (Step S501). Specifically, the parity writing unit 112-2 instructs the fifth access-control unit 205 to read additional second-state aggregation information stored by the third state-storage unit 255. The fifth access-control unit 205 reads the additional second-state aggregation information stored by the third state-storage unit 255, and outputs to the parity writing unit 112-2. The parity writing unit 112-2 acquires the additional second-state aggregation information stored by the third state-storage unit 255. The parity writing unit 112-2 obtains the number of pieces of area information included in the acquired additional second-state aggregation information.

The parity writing unit 112-2 determines whether the number of pieces of area information exceeds a threshold that is preliminarily or dynamically determined (Step S502). If the number of pieces of the obtained area information does not exceed the threshold (No at Step S502), the process ends.

If the number of pieces of the obtained area information exceeds the threshold (Yes at Step S502), the parity writing unit 112-2 reads parity data from the first data-storage unit 151 (Step S503). Specifically, the parity writing unit 112-2 instructs the first access-control unit 101 to read parity data recorded in the first data-storage unit 151. The first access-control unit 101 reads the parity data recorded in the first data-storage unit 151, and outputs to the parity writing unit 112-2. The parity writing unit 112-2 acquires the parity data recorded in the first data-storage unit 151.

Step S504 is a process similar to the process at Step S302 in FIG. 8, therefore, detailed explanation is omitted.

The parity writing unit 112-2 deletes the additional second-state aggregation information from the third state-storage unit 255 (Step S505). Specifically, the parity writing unit 112-2 instructs the fifth access-control unit 205 to delete the additional second-state aggregation information stored by the third state-storage unit 255. The fifth access-control unit 205 deletes the additional second-state aggregation information stored by the third state-storage unit 255.

Third Embodiment

In a data storage apparatus according to a third embodiment, parity data is written into the second data-storage unit 152 from the first data-storage unit 151, each time when the number of storage areas that are changed to the first state exceeds a threshold that is determined preliminarily or dynamically.

Figure 13:
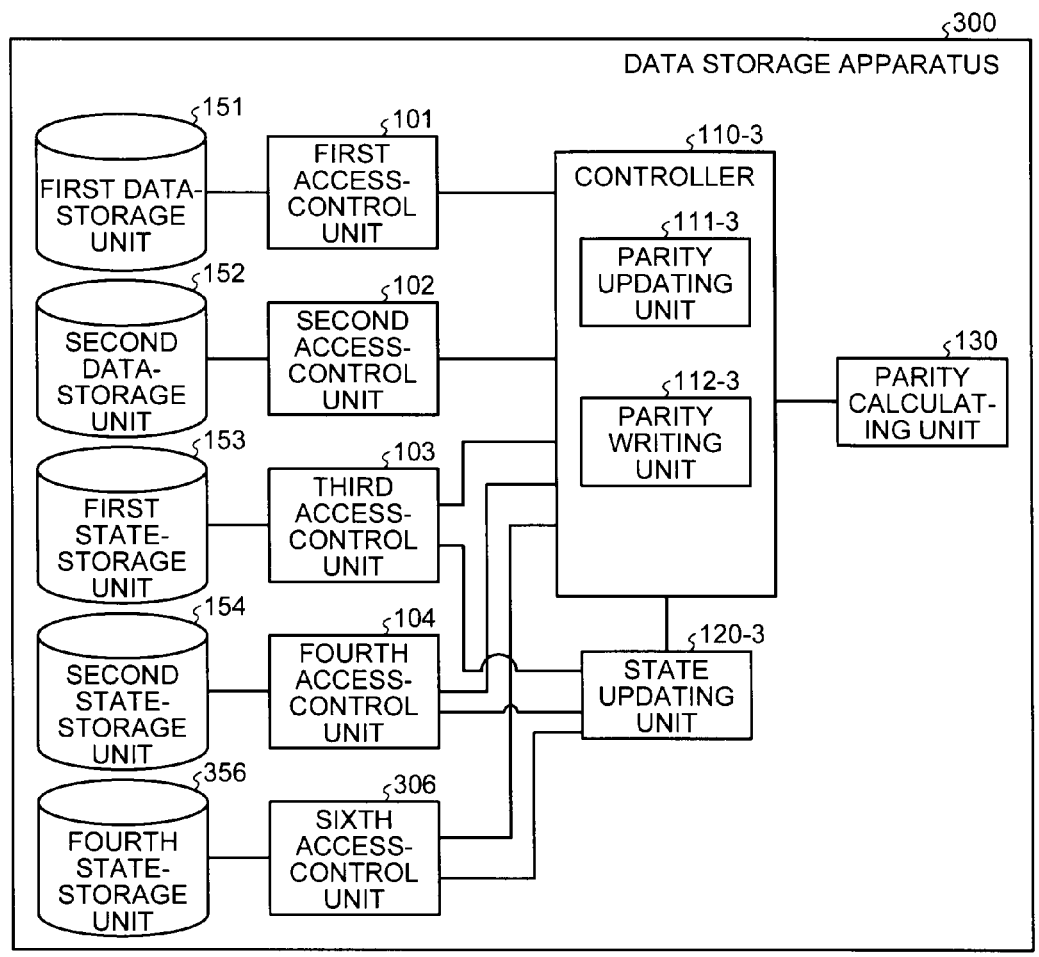
FIG. 13 is a functional block diagram of a data storage apparatus according to a third embodiment.

FIG. 13 is a functional block diagram of a configuration example of a data storage apparatus 300 according to the third embodiment. As shown in FIG. 13, the data storage apparatus 300 includes the first data-storage unit 151, the first access-control unit 101, the second data-storage unit 152, the second access-control unit 102, the first state-storage unit 153, the third access-control unit 103, the second state-storage unit 154, the fourth access-control unit 104, the parity calculating unit 130, a state updating unit 120-3, a controller 110-3, a fourth state-storage unit 356, and a sixth access-control unit 306. The controller 110-3 includes a parity updating unit 111-3 and a parity writing unit 112-3. The same units as the already-explained functional units are assigned with the same reference numerals, and detailed explanations are omitted.

The fourth state-storage unit 356 stores additional first-state aggregation information. An aggregation of storage areas in the first state indicated by the first-state aggregation information stored by the first state-storage unit 153 includes the following two aggregations.

(1) An aggregation of storage areas that have been in the first state continuously since before the latest moment when the parity writing unit 112-3 described later instructs the first access-control unit 101 and the second access-control unit 102 to write parity data recorded in the first data-storage unit 151 into the second data-storage unit 152 (hereinafter, referred to as the latest parity-writing moment).

(2) An aggregation of storage areas that are selected by the state updating unit 120-3 described later from an aggregation of storage areas indicated by the second-state aggregation information as storage areas to be changed to the first state, and resultantly turned to the first state, after the latest parity-writing moment.

Figure 14:
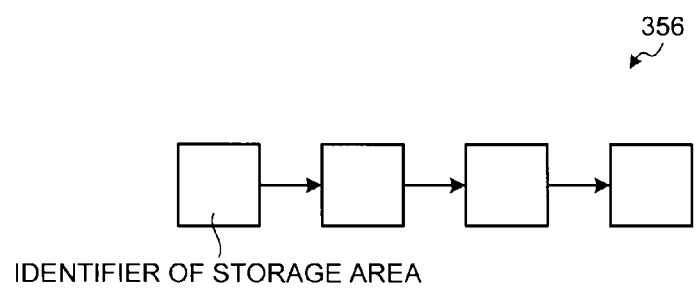
FIG. 14 is a schematic diagram of a configuration example of a fourth state-storage unit.

The additional first-state aggregation information is information about an aggregation of storage areas that are turned to the first state after the latest parity-writing moment (additional first-state aggregation). The additional first-state aggregation information is formed by a list structure of identifiers of storage areas, for example, as shown in FIG. 14.

The sixth access-control unit 306 controls access to the fourth state-storage unit 356. The access to the fourth state-storage unit 356 includes reading of additional first-state aggregation information stored by the fourth state-storage unit 356, addition of storage area information designated by a request source to the additional first-state aggregation information stored by the fourth state-storage unit 356, deletion of storage area information designated by the request source from the additional first-state aggregation information stored by the fourth state-storage unit 356, and deletion of the additional first-state aggregation information stored by the fourth state-storage unit 356.

The state updating unit 120-3 is similar to the state updating unit 120 except that the notice destination is the parity updating unit 111-3 instead of the parity updating unit 111, therefore detailed explanation is omitted.

When identification information about a storage area to be changed to the first state is notified from the state updating unit 120-3, the parity updating unit 111-3 instructs the sixth access-control unit 306 to add the identification information about the notified storage area into the additional first-state aggregation information stored by the fourth state-storage unit 356, in addition to performing the process that is performed when the parity updating unit 111 is notified of identification information about a storage area to be changed to the first state from the state updating unit 120.

The parity updating unit 111-3 is similar to the parity updating unit 111, except that regarding the process when identification information about a storage area to be changed to the second state is notified from the state updating unit 120-3, the notice source is the state updating unit 120-3 instead of the state updating unit 120, therefore detailed explanation is omitted.

The parity writing unit 112-3 instructs the sixth access-control unit 306 to read the additional first-state aggregation information stored by the fourth state-storage unit 356, and acquires the additional first-state aggregation information stored by the fourth state-storage unit 356. The parity writing unit 112-3 obtains the number of pieces of identification information about a storage area included in the acquired additional first-state aggregation information. When the number of pieces of the obtained area information exceeds a threshold that is preliminarily or dynamically determined, the parity writing unit 112-3 instructs the sixth access-control unit 306 to delete the additional first-state aggregation information stored by the fourth state-storage unit 356, in addition to the parity writing instruction that the parity writing unit 112 gives.

Figure 15:
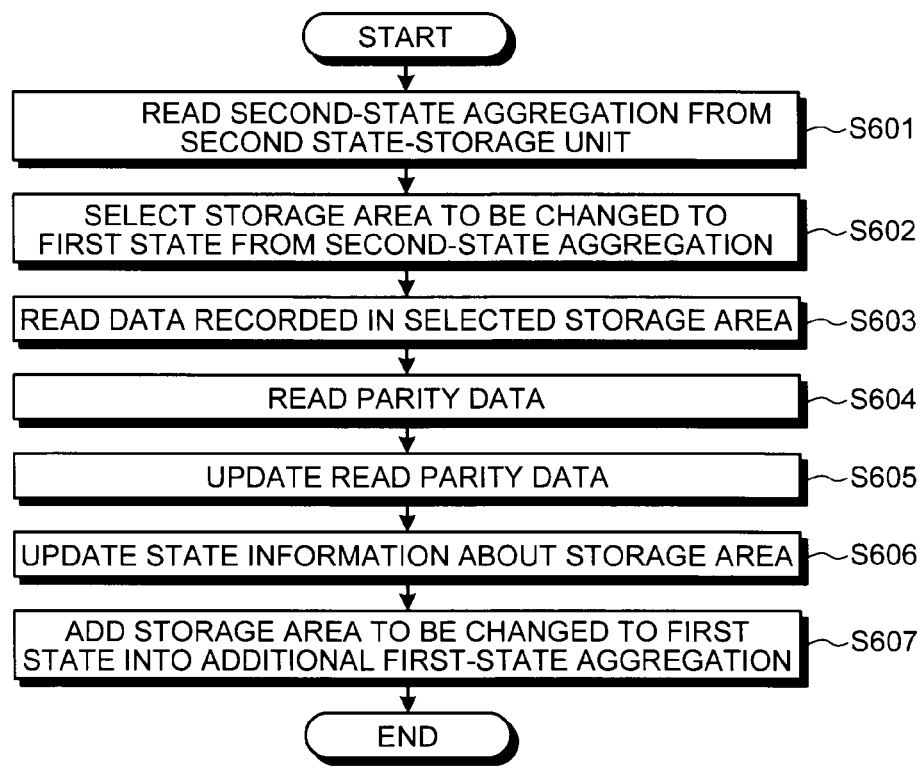
FIG. 15 is a flowchart of a process of changing a storage area to the first state according to the third embodiment.

The process performed by the data storage apparatus 300 according to the third embodiment thus configured is explained below with reference to FIG. 15. FIG. 15 is a flowchart that depicts a flow of a process of changing a storage area to the first state according to the third embodiment.

Steps S601 to S606 are processes similar to the processes at Steps S101 to S106 by the data storage apparatus 100 according to the first embodiment, therefore, explanations of them are omitted.

At Step S607, the parity updating unit 111-3 adds the identification information about the storage area to be changed to the first state to the additional first-state aggregation information. Specifically, the parity updating unit 111-3 instructs the sixth access-control unit 306 to add the identification information about the storage area notified from the state updating unit 120-3, into the additional first-state aggregation information stored by the fourth state-storage unit 356. The sixth access-control unit 306 adds the identification information about the storage area that is notified to the parity updating unit 111-3 from the state updating unit 120-3, into the additional first-state aggregation information stored by the fourth state-storage unit 356.

A flow of a process of changing a storage area to the second state is similar to FIG. 7 according to the first embodiment, therefore explanation is omitted.

Figure 16:
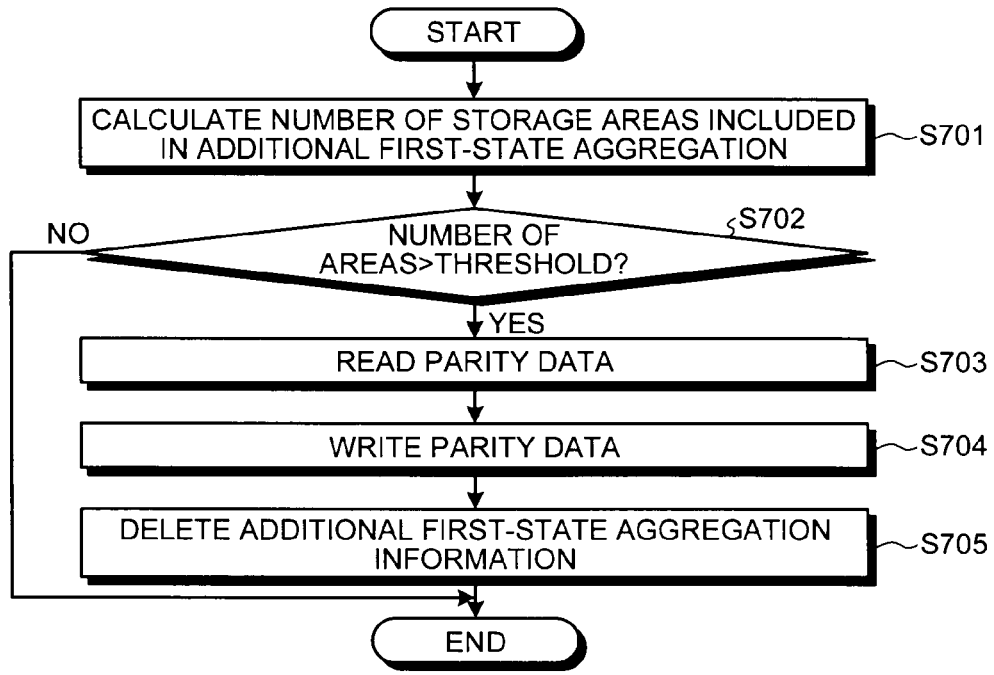
FIG. 16 is a flowchart of a parity writing process according to the third embodiment.

An example of a process procedure of parity writing is then explained below with reference to FIG. 16. FIG. 16 is a flowchart that depicts a flow of a parity writing process according to the third embodiment.

To begin with, the parity writing unit 112-3 obtains the number of pieces of area information included in additional first-state aggregation information (Step S701). Specifically, the parity writing unit 112-3 instructs the sixth access-control unit 306 to read the additional first-state aggregation information stored by the fourth state-storage unit 356. The sixth access-control unit 306 reads the additional first-state aggregation information stored by the fourth state-storage unit 356, and outputs to the parity writing unit 112-3. The parity writing unit 112-3 acquires the additional first-state aggregation information stored by the fourth state-storage unit 356. The parity writing unit 112-3 obtains the number of pieces of area information included in the acquired additional first-state aggregation information.

The parity writing unit 112-3 determines whether the number of pieces of area information exceeds a threshold that is preliminarily or dynamically determined (Step S702). If the number of pieces of the obtained area information does not exceed the threshold (No at Step S702), the process ends.

If the number of pieces of the obtained area information exceeds the threshold (Yes at Step S702), the parity writing unit 112-3 reads parity data from the first data-storage unit 151 (Step S703). Specifically, the parity writing unit 112-3 instructs the first access-control unit 101 to read parity data recorded in the first data-storage unit 151. The first access-control unit 101 reads the parity data recorded in the first data-storage unit 151, and outputs to the parity writing unit 112-3. The parity writing unit 112-3 acquires the parity data recorded in the first data-storage unit 151.

Step S704 is a process similar to the process at Step S302 in FIG. 8, therefore, detailed explanation is omitted.

The parity writing unit 112-3 deletes the additional first-state aggregation information from the fourth state-storage unit 356 (Step S705). Specifically, the parity writing unit 112-3 instructs the sixth access-control unit 306 to delete the additional first-state aggregation information stored by the fourth state-storage unit 356. The sixth access-control unit 306 deletes the additional first-state aggregation information stored by the fourth state-storage unit 356.

Fourth Embodiment

In a data storage apparatus according to a fourth embodiment, parity data is written into the second data-storage unit 152 from the first data-storage unit 151, each time when the number of storage areas that are changed to the first state exceeds a threshold, or each time when the number of storage areas that are changed to the second state exceeds a threshold.

Figure 17:
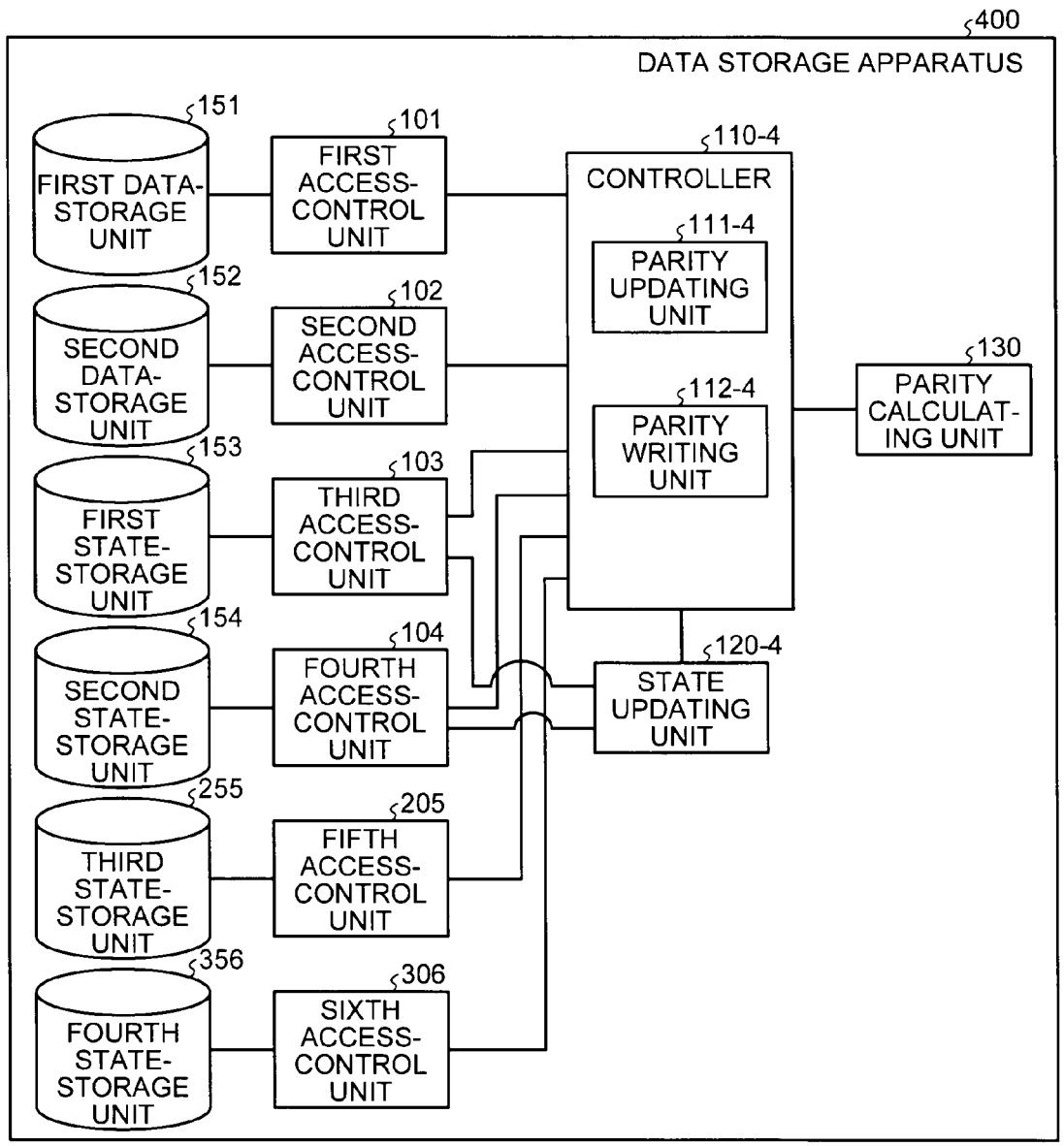
FIG. 17 is a functional block diagram of a data storage apparatus according to a fourth embodiment.

FIG. 17 is a functional block diagram of a configuration example of a data storage apparatus 400 according to the fourth embodiment. As shown in FIG. 17, the data storage apparatus 400 includes the first data-storage unit 151, the first access-control unit 101, the second data-storage unit 152, the second access-control unit 102, the first state-storage unit 153, the third access-control unit 103, the second state-storage unit 154, the fourth access-control unit 104, the parity calculating unit 130, a state updating unit 120-4, a controller 110-4, the third state-storage unit 255, the fifth access-control unit 205, the fourth state-storage unit 356, and the sixth access-control unit 306. The controller 110-4 includes a parity updating unit 111-4 and a parity writing unit 112-4. The same units as the already-explained functional units are assigned with the same reference numerals, and detailed explanations are omitted.

The state updating unit 120-4 is similar to the state updating unit 120 except that the notice destination is the parity updating unit 111-4 instead of the parity updating unit 111, therefore detailed explanation is omitted.

The parity updating unit 111-4 is similar to the parity updating unit 111-3, except that regarding the process when identification information about a storage area to be changed to the first state is notified from the state updating unit 120-4, the notice source is the state updating unit 120-4 instead of the state updating unit 120-3, therefore detailed explanation is omitted.

The parity updating unit 111-4 is similar to the parity updating unit 111-2, except that regarding the process when identification information about a storage area to be changed to the second state is notified from the state updating unit 120-4, the notice source is the state updating unit 120-4 instead of the state updating unit 120-2, therefore detailed explanation is omitted.

The parity writing unit 112-4 instructs the fifth access-control unit 205 to read the additional second-state aggregation information stored by the third state-storage unit 255, and acquires the additional second-state aggregation information stored by the third state-storage unit 255. The parity writing unit 112-4 obtains the number of pieces of area information included in the acquired additional second-state aggregation information. The parity writing unit 112-4 instructs the sixth access-control unit 306 to read the additional first-state aggregation information stored by the fourth state-storage unit 356, and acquires the additional first-state aggregation information stored by the fourth state-storage unit 356. The parity writing unit 112-4 obtains the number of pieces of area information included in the acquired additional first-state aggregation information.

When the number of pieces of area information included in the obtained additional second-state aggregation information exceeds a threshold that is preliminarily or dynamically determined, or when the number of pieces of area information included in the obtained additional first-state aggregation information exceeds a threshold that is preliminarily or dynamically determined; the parity writing unit 112-4 instructs the sixth access-control unit 306 to delete the additional first-state aggregation information stored by the fourth state-storage unit 356, in addition to the parity writing instruction that the parity writing unit 112-2 gives and instructing the fifth access-control unit 205 to delete the additional second-state aggregation information stored by the third state-storage unit 255 that the parity writing unit 112-2 gives.

Figure 18:
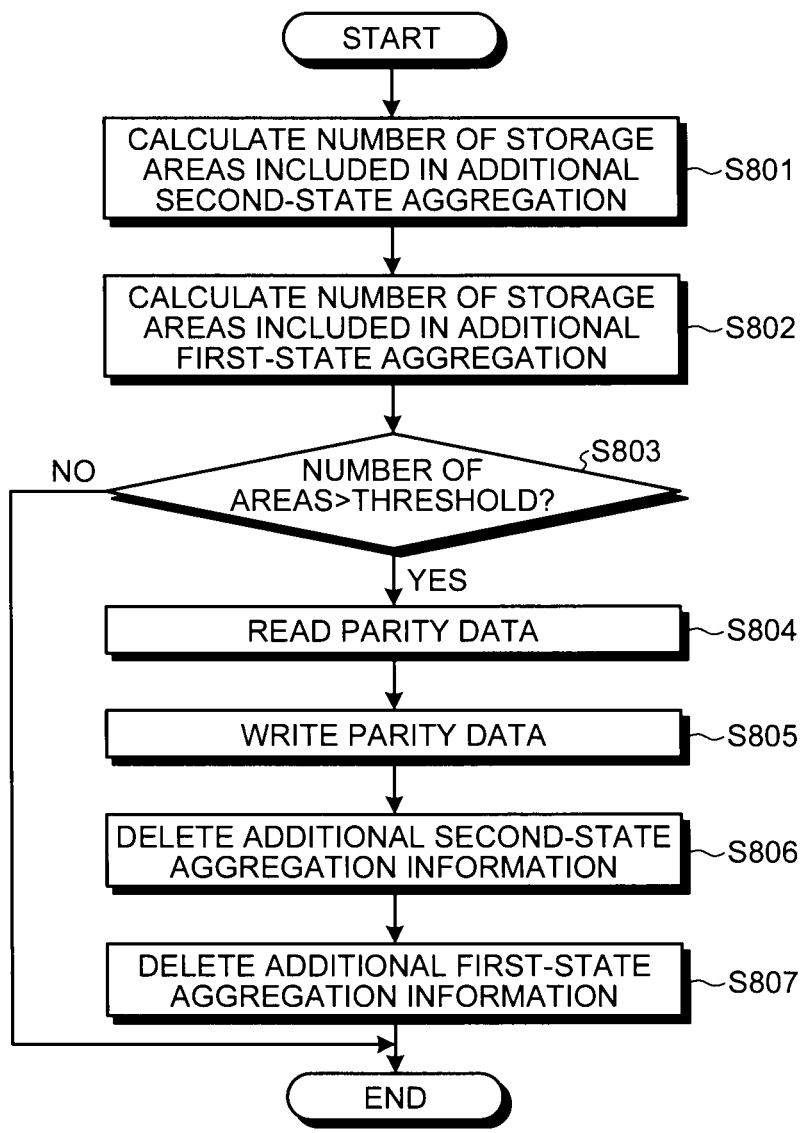
FIG. 18 is a flowchart of a parity writing process according to the fourth embodiment.

The process performed by the data storage apparatus 400 according to the fourth embodiment thus configured is explained below with reference to FIG. 18. A process of changing a storage area to the first state and a process of changing a storage area to the second state are similar to FIG. 15 (the third embodiment) and FIG. 11 (the second embodiment), respectively, therefore explanations are omitted. FIG. 18 is a flowchart that depicts a flow of a parity writing process according to the fourth embodiment.

At Step S801, the number of pieces of area information included in the additional second-state aggregation information is obtained. This process is the same as the process at Step 501 in FIG. 12, except that it is performed by the parity writing unit 112-4 instead of the parity writing unit 112-2, therefore detailed explanation is omitted.

At Step S802, the number of pieces of area information included in the additional first-state aggregation information is obtained. This process is the same as the process at Step 701 in FIG. 16, except that it is performed by the parity writing unit 112-4 instead of the parity writing unit 112-3, therefore detailed explanation is omitted.

The parity writing unit 112-4 determines whether the number of pieces of area information exceeds a threshold (Step S803). Specifically, the parity writing unit 112-4 determines whether the number of pieces of area information included in the additional second-state aggregation information obtained at Step S801 exceeds a threshold that is preliminarily or dynamically determined (first threshold), or whether the number of pieces of area information included in the additional first-state aggregation information obtained at Step S802 exceeds a threshold that is preliminarily or dynamically determined (second threshold). If the obtained number of pieces of area information does not exceed the threshold (No at Step S803), the process ends.

If the obtained number of pieces of area information exceeds the threshold (Yes at Step S803), the parity writing unit 112-4 reads parity data from the first data-storage unit 151 (Step S804). This process is the same as the process at Step 503 in FIG. 12, except that it is performed by the parity writing unit 112-4 instead of the parity writing unit 112-2, therefore detailed explanation is omitted.

Steps S805 to S806 are processes similar to the processes at Steps S504 to S505 by the data storage apparatus 200 according to the second embodiment, therefore, explanations of them are omitted. Moreover, Step S807 is a process similar to the process at Step S705 by the data storage apparatus 300 according to the third embodiment, therefore, explanation of it is omitted.

Fifth Embodiment

When using memories having the properties described above, a volatile memory is used for the first data-storage unit 151, and a nonvolatile memory is used for the second data-storage unit 152, in some cases. Accordingly, for example, when the power of the data storage apparatus is turned off, parity data recorded on the first data-storage unit 151 is lost. For this reason, if unexpected power-down occurs, when the power of the data storage apparatus is turned on afterward, parity data that is recorded on the first data-storage unit 151 before the power-down needs to be recovered.

The parity data recorded in the first data-storage unit 151 before the power-down can be recovered by reading all of data recorded in storage areas in the first state and performing parity calculation, based on the first-state aggregation information stored by the first state-storage unit 153. However, when a large number of storage areas are included in the parity group, the process time is increased.

According to a fifth embodiment, reduction in the time of parity data recovery is facilitated by using additional second-state aggregation information stored by the third state-storage unit 255 and additional first-state aggregation information stored by the fourth state-storage unit 356.

The process of executing the recovery of parity data recorded in the first data-storage unit 151 is not limited to the above case. For example, the process can be executed when an error is detected in the parity data recorded in the first data-storage unit 151, or when a need to recover the parity data recorded in the first data-storage unit 151 arises because of other reasons.

Figure 19:
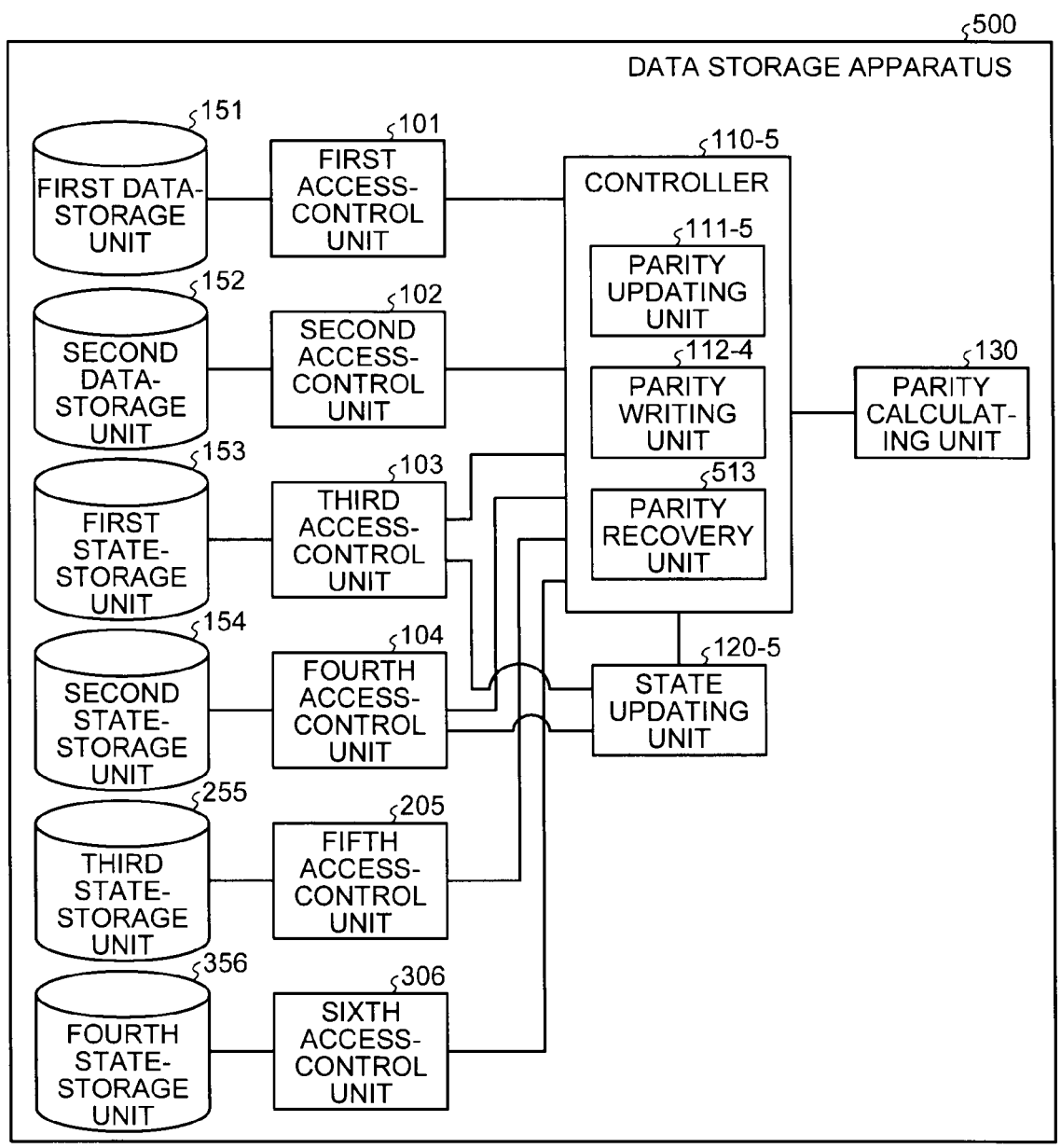
FIG. 19 is a functional block diagram of a data storage apparatus according to a fifth embodiment.

FIG. 19 is a functional block diagram of a configuration example of a data storage apparatus 500 according to the fifth embodiment. As shown in FIG. 19, the data storage apparatus 500 includes the first data-storage unit 151, the first access-control unit 101, the second data-storage unit 152, the second access-control unit 102, the first state-storage unit 153, the third access-control unit 103, the second state-storage unit 154, the fourth access-control unit 104, the parity calculating unit 130, a state updating unit 120-5, a controller 110-5, the third state-storage unit 255, the fifth access-control unit 205, the fourth state-storage unit 356, and the sixth access-control unit 306. The controller 110-5 includes a parity updating unit 111-5, the parity writing unit 112-4, and a parity recovery unit 513. The same units as the already-explained functional units are assigned with the same reference numerals, and detailed explanations are omitted.

When a need to recover parity data recorded in the first data-storage unit 151 arises, the parity recovery unit 513 instructs the second access-control unit 102 to read parity data that is finally recorded in the second data-storage unit 152, and acquires the latest-recorded parity data in the second data-storage unit 152.

In a Solid State Drive (SSD), for example, for the purpose of distribution of the number of times of deletion in each storage area, when updating a piece of data, updated data is recorded in a storage area different from the storage area in which the data is recorded before the updating, in some cases. Acquiring latest-recorded parity data means to acquire parity data that is finally recorded as actually valid parity data, even when parity data is recorded in a plurality of areas by using the above-mentioned data recording method.

The parity recovery unit 513 instructs the fifth access-control unit 205 to read the additional second-state aggregation information stored by the third state-storage unit 255, and acquires the additional second-state aggregation information stored by the third state-storage unit 255.

The parity recovery unit 513 instructs the second access-control unit 102 to read data stored by storage areas corresponding to the additional second-state aggregation information from respective storage areas of the second data-storage unit 152 corresponding to the acquired additional second-state aggregation information, and acquires the data stored by the storage areas corresponding to the additional second-state aggregation information.

The parity recovery unit 513 instructs the sixth access-control unit 306 to read the additional first-state aggregation information stored by the fourth state-storage unit 356, and acquires the additional first-state aggregation information stored by the fourth state-storage unit 356.

The parity recovery unit 513 instructs the second access-control unit 102 to read data stored by storage areas corresponding to the additional first-state aggregation information from respective storage areas of the second data-storage unit 152 corresponding to the acquired additional first-state aggregation information, and acquires the data stored by the storage areas corresponding to the additional first-state aggregation information.

The parity recovery unit 513 instructs the parity calculating unit 130 to perform parity calculation on the acquired latest-recorded parity data in the second data-storage unit 152, a group of data stored by the storage areas corresponding to the acquired additional second-state aggregation information, and a group of data stored by the storage areas corresponding to the acquired additional first-state aggregation information, and acquires updated parity data.

The order of the above procedure can be appropriately interchanged within a range resulting in no change in a final result of the parity calculation.

The parity recovery unit 513 instructs the first access-control unit 101 to record the acquired updated parity data into the first data-storage unit 151.

The state updating unit 120-5 instructs the fourth access-control unit 104 to read the second-state aggregation information stored by the second state-storage unit 154, as required, and acquires the second-state aggregation information. The state updating unit 120-5 instructs the fifth access-control unit 205 to read the additional second-state aggregation information stored by the third state-storage unit 255, and acquires the additional second-state aggregation information. The state updating unit 120-5 selects a storage area to be changed to the first state from an aggregation excluding an aggregation of the storage areas indicated by the acquired additional second-state aggregation information from an aggregation of the storage areas indicated by the acquired second-state aggregation information, and notifies the parity updating unit 111-5 of identification information about the selected storage area.

The parity updating unit 111-5 is similar to the parity updating unit 111-4, except that the notice source is the state updating unit 120-5 instead of the state updating unit 120-4, therefore, detailed explanation is omitted.

Figure 20:
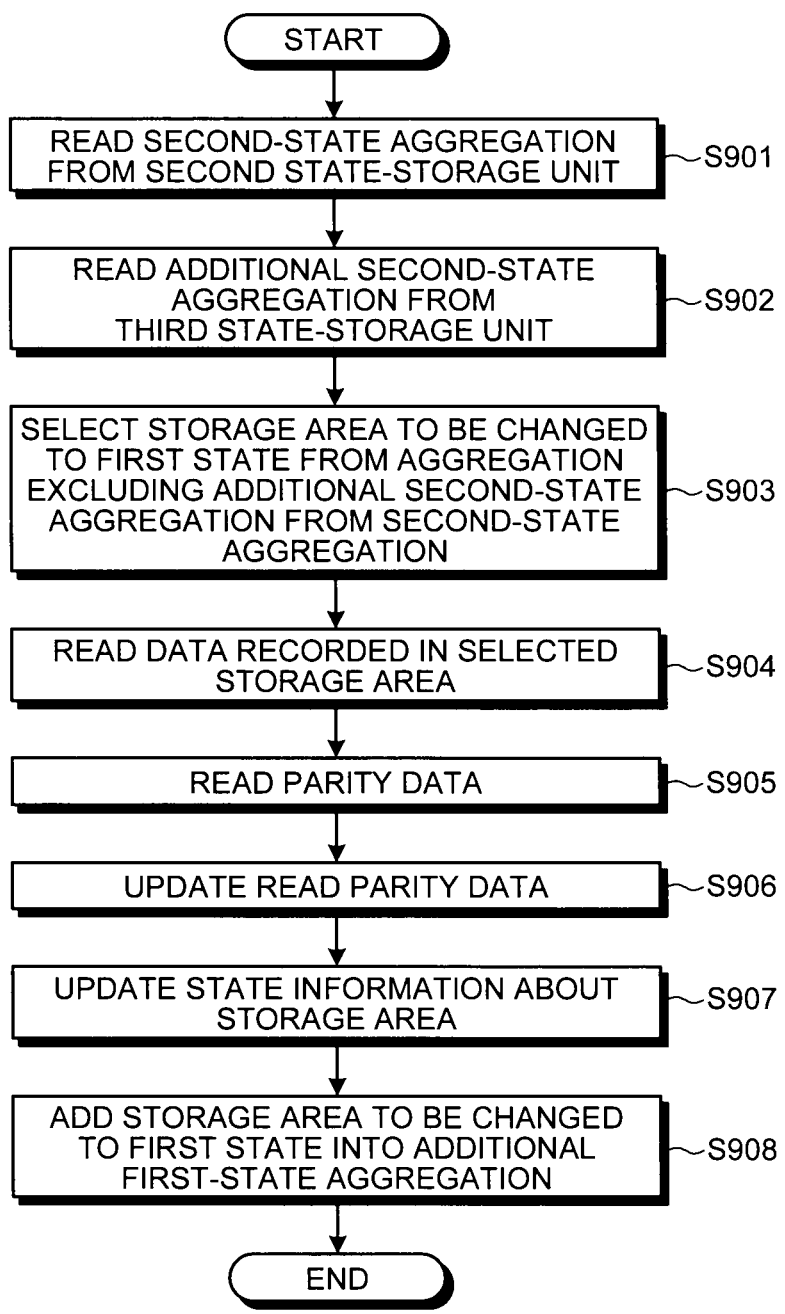
FIG. 20 is a flowchart of a process of changing a storage area to the first state according to the fifth embodiment.

The process performed by the data storage apparatus 500 according to the fifth embodiment thus configured is explained below with reference to FIG. 20. FIG. 20 is a flowchart that depicts a flow of a process of changing a storage area to the first state according to the fifth embodiment.

To begin with, the state updating unit 120-5 reads a second-state aggregation from the second state-storage unit 154, as required (Step S901). Specifically, the state updating unit 120-5 instructs the fourth access-control unit 104 to read second-state aggregation information stored by the second state-storage unit 154. The fourth access-control unit 104 reads the second-state aggregation information stored by the second state-storage unit 154, and outputs to the state updating unit 120-5. The state updating unit 120-5 acquires the second-state aggregation. The state updating unit 120-5 instructs the fifth access-control unit 205 to read additional second-state aggregation information stored by the third state-storage unit 255 (Step S902). The fifth access-control unit 205 reads the additional second-state aggregation information stored by the third state-storage unit 255, and outputs to the state updating unit 120-5. The state updating unit 120-5 acquires the additional second-state aggregation information. The state updating unit 120-5 selects a storage area to be changed to the first state from an aggregation excluding an aggregation of storage areas indicated by the acquired additional second-state aggregation information from an aggregation of storage areas indicated by the acquired second-state aggregation information, and notifies the parity updating unit 111-5 of identification information about the selected storage area (Step S903).

Steps S904 to S908 are processes similar to the processes at Steps S603 to S607 by the data storage apparatus 300 according to the third embodiment, therefore, explanations of them are omitted.

The reason why restrictions are provided onto storage areas to be changed to the first state is because data stored by storage areas indicated by additional second-state aggregation information is needed when recovering parity data described later. For this reason, according to the embodiment, the rewriting process of user data is permitted only in storage areas in the second state included in an aggregation excluding an aggregation of storage areas indicated by the additional second-state aggregation information from an aggregation of storage areas indicated by the second-state aggregation information. In other words, the rewriting process of user data is not permitted in storage areas in the second state included in an aggregation of storage areas indicated by the additional second-state aggregation information. Accordingly, the data stored by storage areas indicated by the additional second-state aggregation information can be retained.

An example of the process procedure of changing a storage area to the second state and an example of the process procedure of the parity writing are similar to the fourth embodiment, therefore, detailed explanations are omitted.

Figure 21:
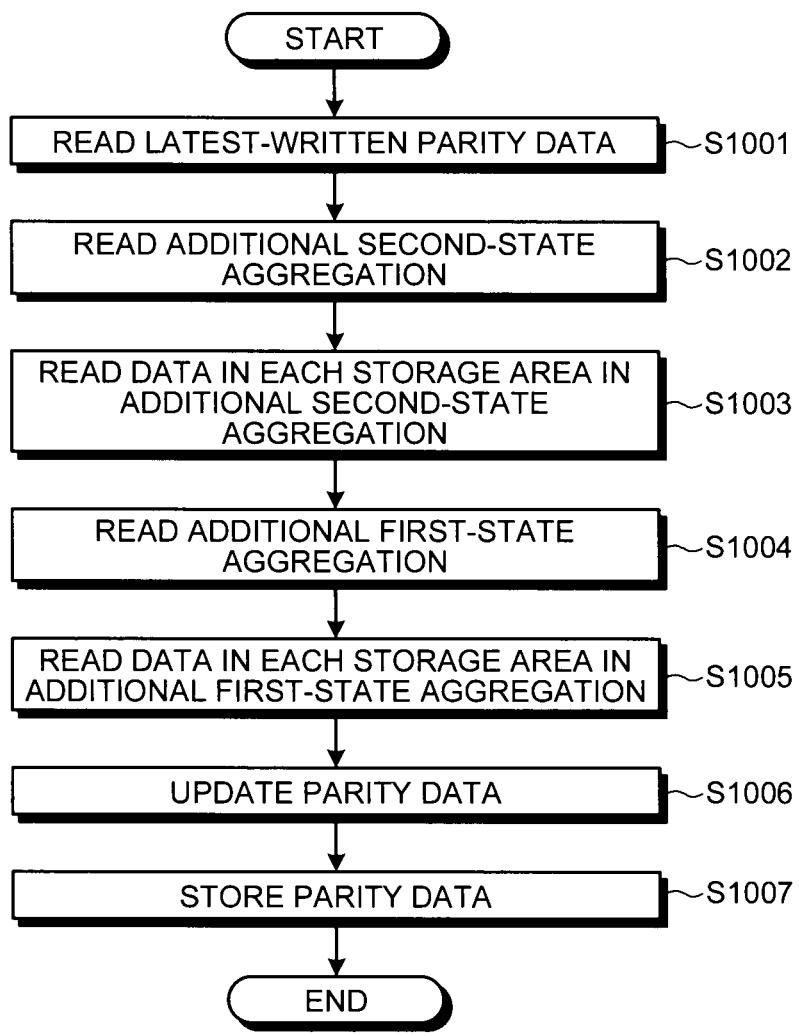
FIG. 21 is a flowchart of a process example of recovering parity data according to the fifth embodiment.

An example of a process procedure of recovering parity data is then explained below with reference to FIG. 21.

To begin with, the parity recovery unit 513 reads parity data that is finally written (Step S1001). Specifically, when a need to recover parity data recorded in the first data-storage unit 151 arises, the parity recovery unit 513 instructs the second access-control unit 102 to read parity data that is finally recorded into the second data-storage unit 152. The second access-control unit 102 reads the parity data that is finally recorded into the second data-storage unit 152, and outputs to the parity recovery unit 513. The parity recovery unit 513 acquires the parity data that is finally recorded into the second data-storage unit 152.

The parity recovery unit 513 reads data stored by storage areas corresponding to additional second-state aggregation information. Specifically, the parity recovery unit 513 instructs the fifth access-control unit 205 to read additional second-state aggregation information stored by the third state-storage unit 255. The fifth access-control unit 205 reads the additional second-state aggregation information stored by the third state-storage unit 255, and outputs to the parity recovery unit 513. The parity recovery unit 513 acquires the additional second-state aggregation information stored by the third state-storage unit 255 (Step S1002). The parity recovery unit 513 instructs the second access-control unit 102 to read data stored by storage areas corresponding to the additional second-state aggregation information, with respect to each of storage areas of the second data-storage unit 152 corresponding to the acquired additional second-state aggregation information. The second access-control unit 102 reads the data stored by the storage areas corresponding to the additional second-state aggregation information acquired by the parity recovery unit 513, and outputs to the parity recovery unit 513. The parity recovery unit 513 acquires the data stored by the storage areas corresponding to the additional second-state aggregation information (Step S1003).

The parity recovery unit 513 reads data stored by storage areas corresponding to additional first-state aggregation information. Specifically, the parity recovery unit 513 instructs the sixth access-control unit 306 to read additional first-state aggregation information stored by the fourth state-storage unit 356. The sixth access-control unit 306 reads the additional first-state aggregation information stored by the fourth state-storage unit 356, and outputs to the parity recovery unit 513. The parity recovery unit 513 acquires the additional first-state aggregation information stored by the fourth state-storage unit 356 (Step S1004). The parity recovery unit 513 instructs the second access-control unit 102 to read data stored by storage areas corresponding to the additional first-state aggregation information, with respect to each of storage areas of the second data-storage unit 152 corresponding to the acquired additional first-state aggregation information. The second access-control unit 102 reads the data stored by the storage areas corresponding to the additional first-state aggregation information acquired by the parity recovery unit 513, and outputs to the parity recovery unit 513. The parity recovery unit 513 acquires the data stored by the storage areas corresponding to the additional first-state aggregation information (Step S1005).

The parity recovery unit 513 updates parity data (Step S1006). Specifically, the parity recovery unit 513 instructs the parity calculating unit 130 to perform parity calculation on the acquired latest-recorded parity data in the second data-storage unit 152, a group of data stored by the storage areas corresponding to the acquired additional second-state aggregation information, and a group of data stored by the storage areas corresponding to the acquired additional first-state aggregation information. The parity calculating unit 130 performs parity calculation on a plurality of input data received from the instruction source, and returns a calculation result to the instruction source. The parity recovery unit 513 acquires updated parity data.

The parity recovery unit 513 stores the parity data (Step S1007). Specifically, the parity recovery unit 513 instructs the first access-control unit 101 to write the acquired updated parity data into the first data-storage unit 151. The first access-control unit 101 writes the updated parity data into the first data-storage unit 151.

In this way, the data storage apparatus according to the fifth embodiment can recover parity data without reading all of user data stored in storage areas in the first state, by using additional second-state aggregation information and additional first-state aggregation information. Accordingly, reduction in a recovery time of parity data can be achieved.

Sixth Embodiment

If the probability of recovering user data is increased in accordance with parity data, reliability of a data storage apparatus can be further improved. In a case of parity data through an exclusive OR operation, a piece of user data in the same parity group can be recovered with the parity data, and two or more pieces of user data in the same parity group cannot be recovered with the parity data. By appropriately modifying the following embodiment, it can be applied to a data recovery code through an operation method other than the exclusive OR operation.

A data storage apparatus according to a sixth embodiment achieves recovery of two or more pieces of user data in the same parity group, by using additional second-state aggregation information and additional first-state aggregation information. Hereinafter, a recovery method for user data according to the sixth embodiment is referred to as repetitive difference correction.

Figure 22:
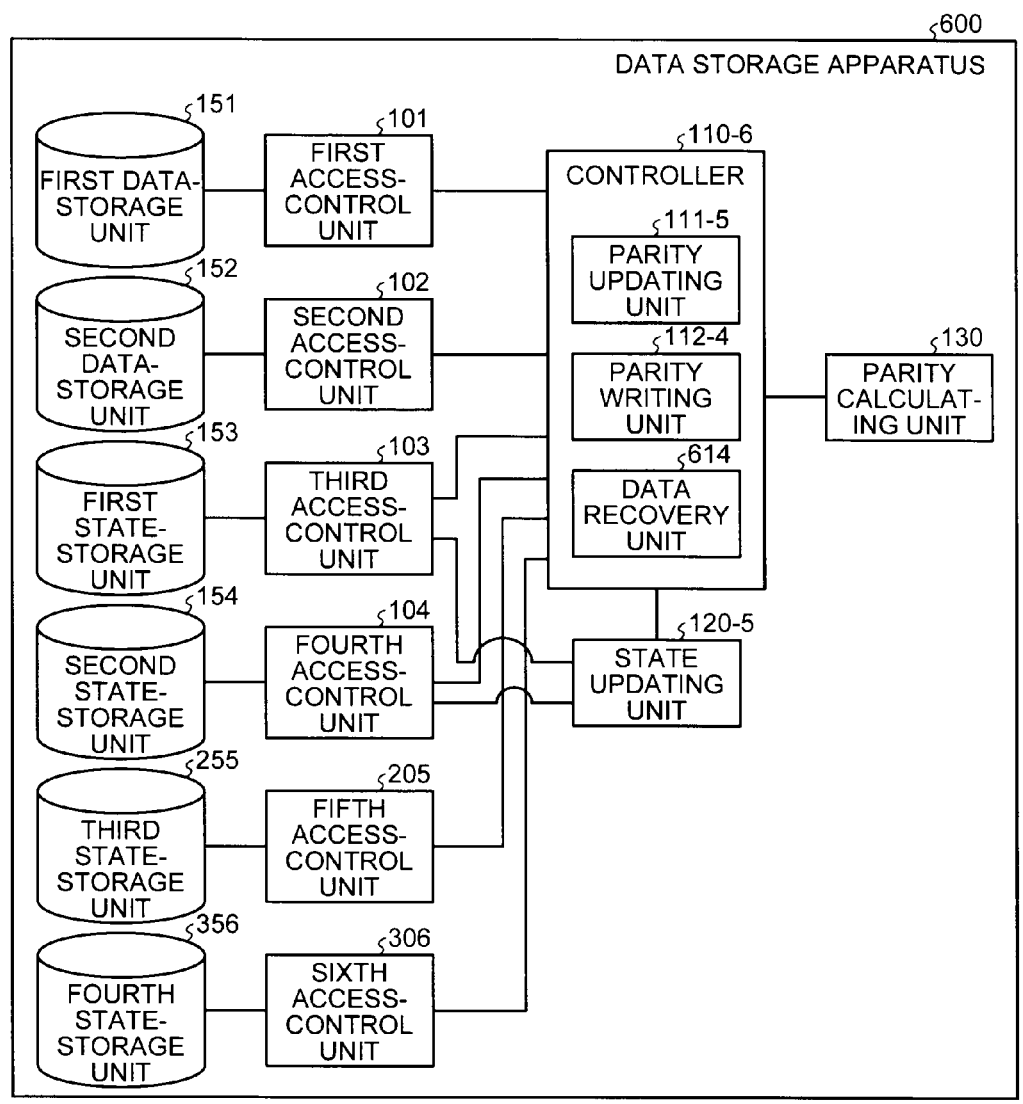
FIG. 22 is a functional block diagram of a data storage apparatus according to a sixth embodiment.

FIG. 22 is a functional block diagram of a configuration example of a data storage apparatus 600 according to the sixth embodiment. As shown in FIG. 22, the data storage apparatus 600 includes the first data-storage unit 151, the first access-control unit 101, the second data-storage unit 152, the second access-control unit 102, the first state-storage unit 153, the third access-control unit 103, the second state-storage unit 154, the fourth access-control unit 104, the parity calculating unit 130, the state updating unit 120-5, a controller 110-6, the third state-storage unit 255, the fifth access-control unit 205, the fourth state-storage unit 356, and the sixth access-control unit 306. The controller 110-6 includes the parity updating unit 111-5, the parity writing unit 112-4, and a parity recovery unit 614. The same units as the already-explained functional units are assigned with the same reference numerals, and detailed explanations are omitted.

Figure 23:
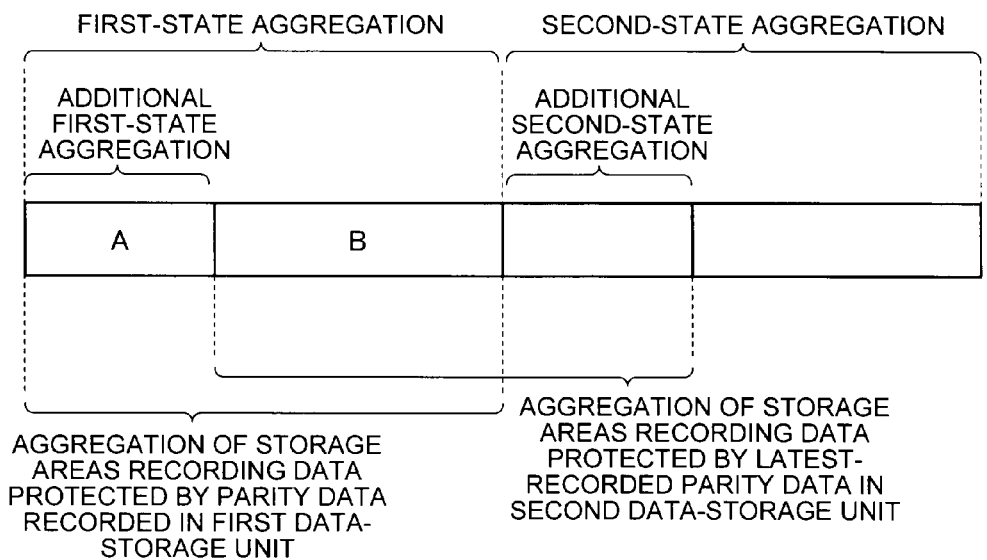
FIG. 23 is a schematic diagram that depicts relation between a state of storage areas and a protection state of data.

Prior to starting an explanation of the data recovery unit 614, relation between storage areas and a protection state of data is explained below. FIG. 23 is a schematic diagram that depicts relation between a state of storage areas and a protection state of data recorded in the storage areas by parity data.

As shown in FIG. 23, an aggregation of storage areas indicated by additional first-state aggregation information (additional first-state aggregation) is included in an aggregation of storage areas indicated by first-state aggregation information (first-state aggregation). An aggregation of storage areas indicated by additional second-state aggregation information (additional second-state aggregation) is included in an aggregation of storage areas indicated by second-state aggregation information (second-state aggregation).

As shown in FIG. 23, the first-state aggregation is an aggregation of storage areas recording data protected by parity data recorded in the first data-storage unit 151. An aggregation of storage areas that combines the additional second-state aggregation and an aggregation of storage areas excluding the additional first-state aggregation from the first-state aggregation is an aggregation of storage areas recording data protected by latest-recorded parity data in the second data-storage unit 152.

As shown in FIG. 23, when among two storage areas that store therein data desired to be recovered, one storage area (hereinafter, referred to as a storage area A) is included in an aggregation of storage areas indicated by the additional first-state aggregation information, and the other storage area (hereinafter, referred to as a storage area B) is included in an aggregation of storage areas excluding the additional first-state aggregation from the first-state aggregation, repetitive difference correction can be executed. Under such state, the two storage areas that store therein data desired to be recovered with parity data are included in the same parity group (the first-state aggregation), so that the data cannot be recovered through a usual data-recovery process with parity data.

Return to the explanation of the data recovery unit 614 shown in FIG. 22. When receiving from a not-shown recovery-request source a repetitive difference-correction request including identification information about the two storage areas that store therein data desired to be recovered, the data recovery unit 614 determines whether among the two storage areas, one storage area (the storage area A) is included in the additional first-state aggregation, and the other storage area (the storage area B) is included in the aggregation of storage areas excluding the additional first-state aggregation from the first-state aggregation.

Specifically, the data recovery unit 614 instructs the third access-control unit 103 to read the first-state aggregation information stored by the first state-storage unit 153, and acquires the first-state aggregation information stored by the first state-storage unit 153. The data recovery unit 614 instructs the sixth access-control unit 306 to read the additional first-state aggregation information stored by the fourth state-storage unit 356, and acquires the additional first-state aggregation information stored by the fourth state-storage unit 356. The data recovery unit 614 determines whether among the two storage areas included in the received repetitive difference-correction request, one storage area (the storage area A) is included in the aggregation of storage areas corresponding to the acquired additional first-state aggregation information, and the other storage area (the storage area B) is included in the aggregation of storage areas excluding the aggregation of storage areas indicated by the acquired additional first-state aggregation information from the aggregation of storage areas indicated by the acquired first-state aggregation information. If a determination result is false, the data recovery unit 614 outputs to the not-shown recover-request source that repetitive difference correction cannot be performed.

The data recovery unit 614 recovers data in the storage area B. To begin with, the data recovery unit 614 acquires the latest-recorded parity data in the second data-storage unit 152, and user data required for recovery with parity data.

Specifically, the data recovery unit 614 instructs the fifth access-control unit 205 to read the additional second-state aggregation information stored by the third state-storage unit 255, and acquires the additional second-state aggregation information stored by the third state-storage unit 255. The data recovery unit 614 instructs the second access-control unit 102 to read the latest-recorded parity data in the second data-storage unit 152, and acquires the latest-recorded parity data in the second data-storage unit 152. Moreover, the data recovery unit 614 instructs the second access-control unit 102 to read data stored by each of storage areas in an aggregation of storage areas excluding a storage area of the storage area B from an aggregation of storage areas that combines the aggregation of storage areas indicated by the acquired additional second-state aggregation information and the aggregation of storage areas excluding the aggregation of storage areas indicated by the acquired additional first-state aggregation information from the aggregation of storage areas indicated by the acquired first-state aggregation; and acquires the data stored by each of the storage areas.

The data recovery unit 614 then recovers the data in the storage area B, from the acquired latest-recorded parity data in the second data-storage unit 152, and the user data required for recovery with parity data.

Specifically, the data recovery unit 614 instructs the parity calculating unit 130 to perform parity calculation on the acquired latest-recorded parity data in the second data-storage unit 152 and the acquired data group, and acquires resultantly-recovered data in the storage area B.

The data recovery unit 614 recovers data in the storage area A. To begin with, the data recovery unit 614 acquires the parity data recorded in the first data-storage unit 151, and user data required for recovery with parity data. The recovered data is to be treated as data in the storage area B.

Specifically, the data recovery unit 614 instructs the first access-control unit 101 to read the parity data recorded in the first data-storage unit 151, and acquires the parity data recorded in the first data-storage unit 151. Moreover, the data recovery unit 614 instructs the second access-control unit 102 to read data stored by each of storage areas in an aggregation of storage areas excluding a storage area of the storage area A and a storage area of the storage area B, from the aggregation of storage areas indicated by the acquired first-state aggregation; and acquires the data stored by each of the storage areas.

The data recovery unit 614 then recovers the data in the storage area A, from the acquired parity data recorded in the first data-storage unit 151, and the user data required for recovery with parity data.

Specifically, the data recovery unit 614 instructs the parity calculating unit 130 to perform parity calculation on the acquired parity data, the acquired data group, and the acquired recovered data in the storage area B, and acquires resultantly-recovered data in the storage area A.

The order of the above procedure can be appropriately interchanged within a range resulting in no change in a final result of the parity calculation. For example, by separately storing an intermediate calculation result of the parity calculation, optimization can be facilitated, for example, the number of times of data reading from the second data-storage unit 152 is reduced.

The data recovery unit 614 returns the recovered data in the storage area A and the recovered data in the storage area B to the not-shown recovery request source.

In this way, by appropriately using the latest-recorded parity data in the second data-storage unit 152, two pieces of user data in the same parity group can be sometimes recovered through repetitive difference correction in some cases, so that the reliability of the data storage apparatus can be further improved.

Figure 24:
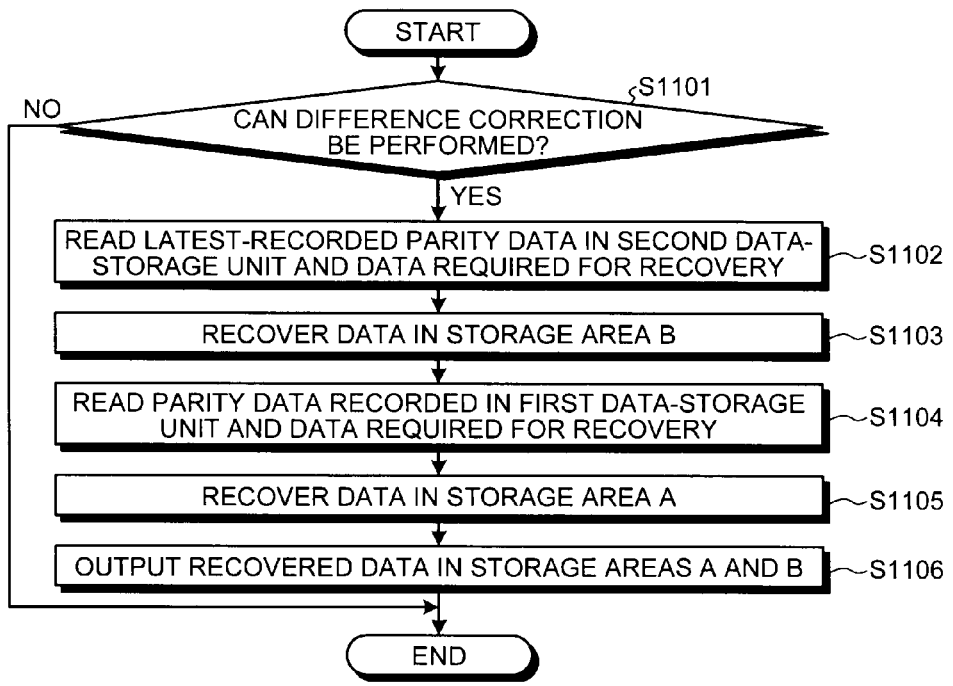
FIG. 24 is a flowchart of an example of a repetitive difference-correction process according to the sixth embodiment.

The process performed by the data storage apparatus 600 according to the sixth embodiment thus configured is explained below with reference to FIG. 24. An example of the process procedure of changing a storage area to the first state, an example of the process procedure of changing a storage area to the second state, and an example of the process procedure of parity writing are similar to those according to the fifth embodiment, therefore detailed explanations are omitted. FIG. 24 is a flowchart that depicts an example of a repetitive difference-correction process according to the sixth embodiment.

To begin with, the data recovery unit 614 determines whether repetitive difference correction can be performed (Step S1101). In other words, when receiving from the not-shown recovery-request source a repetitive difference-correction request including identification information about two storage areas that store therein data desired to be recovered, the data recovery unit 614 determines whether among the two storage areas, one storage area (the storage area A) is included in the additional first-state aggregation, and the other storage area (the storage area B) is included in the aggregation of storage areas excluding the additional first-state aggregation from the first-state aggregation.

Specifically, the data recovery unit 614 instructs the third access-control unit 103 to read the first-state aggregation information stored by the first state-storage unit 153. The third access-control unit 103 reads the first-state aggregation information stored by the first state-storage unit 153, and outputs to the data recovery unit 614. The data recovery unit 614 acquires the first-state aggregation information stored by the first state-storage unit 153. The data recovery unit 614 instructs the sixth access-control unit 306 to read the additional first-state aggregation information stored by the fourth state-storage unit 356. The sixth access-control unit 306 reads the additional first-state aggregation information stored by the fourth state-storage unit 356, and outputs to the data recovery unit 614. The data recovery unit 614 acquires the additional first-state aggregation information stored by the fourth state-storage unit 356. The data recovery unit 614 determines whether among the two storage areas included in the received repetitive difference-correction request, one storage area (the storage area A) is included in the aggregation of storage areas corresponding to the acquired additional first-state aggregation information, and the other storage area (the storage area B) is included in the aggregation of storage areas excluding the aggregation of storage areas indicated by the acquired additional first-state aggregation information from the aggregation of storage areas indicated by the acquired first-state aggregation information.

If a determination result is false (No at Step S1101), the data recovery unit 614 outputs to the not-shown recover-request source that repetitive difference correction cannot be performed, and ends the process. If a determination result is true (Yes at Step S1101), the data recovery unit 614 acquires the latest-recorded parity data in the second data-storage unit 152, and user data required for recovery with parity data (Step S1102). Specifically, the data recovery unit 614 instructs the fifth access-control unit 205 to read the additional second-state aggregation information stored by the third state-storage unit 255. The fifth access-control unit 205 reads the additional second-state aggregation information stored by the third state-storage unit 255, and outputs to the data recovery unit 614. The data recovery unit 614 acquires the additional second-state aggregation information stored by the third state-storage unit 255. The data recovery unit 614 instructs the second access-control unit 102 to read the latest-recorded parity data in the second data-storage unit 152. The second access-control unit 102 reads the latest-recorded parity data in the second data-storage unit 152, and outputs to the data recovery unit 614. The data recovery unit 614 acquires the latest-recorded parity data in the second data-storage unit 152.

Moreover, the data recovery unit 614 instructs the second access-control unit 102 to read data stored by each of storage areas in an aggregation of storage areas excluding a storage area of the storage area B from an aggregation of storage areas that combines the aggregation of storage areas indicated by the acquired additional second-state aggregation information and the aggregation of storage areas excluding the aggregation of storage areas indicated by the acquired additional first-state aggregation information from the aggregation of storage areas indicated by the acquired first-state aggregation. The second access-control unit 102 reads the data stored by each of the instructed storage areas, and outputs to the data recovery unit 614. The data recovery unit 614 acquires the data stored by each of the storage areas.

The data recovery unit 614 recovers data in the storage area B (Step S1103). Specifically, the data recovery unit 614 instructs the parity calculating unit 130 to perform parity calculation on the acquired latest-recorded parity data in the second data-storage unit 152 and the acquired data group. The parity calculating unit 130 performs parity calculation on a plurality of input data received from the instruction source, and returns a calculation result to the instruction source. The data recovery unit 614 acquires resultantly-recovered data in the storage area B.

The data recovery unit 614 acquires the parity data recorded in the first data-storage unit 151 and user data required for recovery with parity data (Step S1104). Specifically, the data recovery unit 614 instructs the first access-control unit 101 to read the parity data recorded in the first data-storage unit 151. The first access-control unit 101 reads the parity data recorded in the first data-storage unit 151, and outputs to the data recovery unit 614. The data recovery unit 614 acquires the parity data recorded in the first data-storage unit 151. The data recovery unit 614 instructs the second access-control unit 102 to read data stored by each of storage areas in an aggregation of storage areas excluding a storage area of the storage area A and a storage area of the storage area B, from the aggregation of storage areas indicated by the acquired first-state aggregation. The second access-control unit 102 reads the data stored by each of the instructed storage areas, and outputs to the data recovery unit 614. The data recovery unit 614 acquires the data stored by each of the storage areas.

The data recovery unit 614 recovers data in the storage area A (Step S1105). Specifically, the data recovery unit 614 instructs the parity calculating unit 130 to perform parity calculation on the acquired parity data, the acquired data group, and the acquired recovered data in the storage area B. The parity calculating unit 130 performs parity calculation on a plurality of input data received from the instruction source, and returns a calculation result to the instruction source. The data recovery unit 614 acquires resultantly-recovered data in the storage area A. The order of the procedure from Step S1102 to Step S1105 can be appropriately interchanged within a range resulting in no change in a final result of the parity calculation. By interchanging the order of the procedure from Step S1102 to Step S1105, for example, by separately storing an intermediate calculation result of the parity calculation, optimization can be facilitated, for example, the number of times of data reading from the second data-storage unit 152 is reduced.

The data recovery unit 614 returns the recovered data in the storage area A and the recovered data in the storage area B to the not-shown recovery request source (Step S1106).

In this way, the data storage apparatus according to the sixth embodiment can recover two pieces of user data in the same parity group through repetitive difference correction by using the latest-recorded parity data in the second data-storage unit 152. Accordingly, the reliability of the data storage apparatus can be further improved.

As described above, according to the first to the sixth embodiments, the reliability of the data storage apparatus as a single apparatus can be improved. Moreover, when updating parity data, the updated parity data is stored into the first data-storage unit, and the parity data stored in the first data-storage unit is written into the second data-storage unit at certain timing. Accordingly, compared with the writing amount of user data onto a storage medium, the writing amount of parity data onto the storage medium can be reduced.

A hardware configuration of the controller according to the first to sixth embodiments is explained below. The controller according to the first to sixth embodiments includes a control device, such as a Central Process Unit (CPU), a storage unit, such as a Read-Only Memory (ROM) and a Random Access Memory (RAM), and a bus that connects each unit.

A computer program to be executed by the controller according to the first to sixth embodiments is provided by being incorporated in, e.g., a ROM, in advance.

The computer program to be executed by the controller according to the first to sixth embodiments can be configured to be provided as a computer program product by recording it in a file in an installable format or an executable format, on a computer readable recording medium, such as a Compact Disk Read Only Memory (CD-ROM), a Flexible Disk (FD), a Compact Disk Recordable (CD-R), or a Digital Versatile Disk (DVD).

Furthermore, the computer program to be executed by the controller according to the first to sixth embodiments can be configured to be provided by storing it in a computer that is connected to a network, such as the Internet, and letting it to be downloaded via the network. Moreover, the computer program to be executed by the controller according to the first to sixth embodiments can be configured to be provided or distributed via a network, such as the Internet.

The computer program to be executed by the controller according to the first to sixth embodiments can cause a computer to function as each of the units of the storage apparatus described above (the parity updating unit, and the parity writing unit). The computer can execute the computer program by reading it with a CPU from a computer-readable storage medium onto a main memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirits of the inventions.

What is claimed is:

1. A controller that controls writing into a first data-storage unit and a second data-storage unit included in a storage apparatus, and reading from the first data-storage unit and the second data-storage unit, the second data-storage unit storing user data of which writing is requested by a host device and parity data of the user data, the first data-storage unit storing the parity data, a storage area in the second data-storage unit in which user data is stored having a first state and a second state, the first state being a state that user data stored in the storage area is protected by the parity data stored by the first data-storage unit, the second state being a state that user data stored in the storage area is not protected by the parity data stored by the first data-storage unit, the controller comprising:

a parity updating unit that updates the parity data when the state of the storage area is changed, and writes first parity data into the first data-storage unit, the first parity data being the updated parity data; and a parity writing unit that reads the parity data written in the first data-storage unit and writes second parity data into the second data-storage unit at a timing determined independently from the timing of updating of the parity data, the second parity data being the read parity data.

2. The controller according to claim 1, wherein the storage apparatus further includes a first state-storage unit that stores identification information about a storage area in the first state, and a second state-storage unit that stores identification information about a storage area in the second state, when a storage area of the second data-storage unit is changed from the first state to the second state, the parity updating unit writes into the first data-storage unit the first parity data of the user data stored in a storage area in the first state after change, deletes from the first state-storage unit identification information about the storage area that is changed to the second state, and adds into the second state-storage unit the identification information about the storage area that is changed to the second state, and when a storage area of the second data-storage unit is changed from the second state to the first state, the parity updating unit writes into the first data-storage unit the first parity data of the user data stored in the storage area in the first state after change, adds into the first state-storage unit identification information about the storage area that is changed to the first state, and deletes from the second state-storage unit the identification information about the storage area that is changed to the first state.

3. The controller according to claim 2, wherein when the number of storage areas that are changed from the first state to the second state after writing the second parity data into the second data-storage unit exceeds a predetermined first threshold or when the number of storage areas that are changed from the second state to the first state after writing the second parity data into the second data-storage unit exceeds a predetermined second threshold, the parity writing unit reads the parity data written in the first data-storage unit as the second parity data and writes the second parity data into the second data-storage unit.

4. The controller according to claim 3, further comprising a parity recovery unit that writes into the first data-storage unit the first parity data that is calculated based on the user data stored in a storage area identified by identification information stored in a third state-storage unit, the user data stored in a storage area identified by identification information stored in a fourth state-storage unit, and the second parity data stored in the second data-storage unit, the third state-storage unit storing the identification information about the storage area that is changed from the first state to the second state after writing the second parity data into the second data-storage unit, the fourth state-storage unit storing the identification information about the storage area that is changed from the second state to the first state after writing the second parity data into the second data-storage unit.

5. The controller according to claim 3, further comprising a data recovery unit that recovers user data in a second storage area and user data in a first storage area, when the first storage area in which user data is to be recovered is included in a storage area identified by identification information stored in a fourth state-storage unit, and the second storage area in which user data is to be recovered is included in a storage area identified by identification information not stored in the fourth state-storage unit among storage areas identified by identification information stored in the first state-storage unit, by recovering the user data in the second storage area based on the user data stored in a storage area, excluding a storage area identified by identification information stored in the fourth state-storage unit from storage areas identified by identification information stored in the first state-storage unit, and a storage area, excluding the second storage area from storage areas identified by identification information stored in a third state-storage unit, and the second parity data stored in the second data-storage unit, and recovering the user data in the first storage area based on recovered user data, the user data stored in a storage area, excluding the first storage area and the second storage area from storage areas identified by identification information stored in the first state-storage information, and the first parity data stored in the first data-storage unit, the third state-storage unit storing the identification information about the storage area that is changed from the first state to the second state after writing the second parity data into the second data-storage unit, the fourth state-storage unit storing the identification information about the storage area that is changed from the second state to the first state after writing the second parity data into the second data-storage unit.

6. The controller according to claim 2, wherein when the number of storage areas that are changed from the first state to the second state after writing the second parity data into the second data-storage unit exceeds a predetermined first threshold, the parity writing unit reads the parity data written in the first data-storage unit as the second parity data and writes the second parity data into the second data-storage unit.

7. The controller according to claim 2, wherein when the number of storage areas that are changed from the second state to the first state after writing the second parity data into the second data-storage unit exceeds a predetermined second threshold, the parity writing unit reads the parity data written in the first data-storage unit as the second parity data and writes the second parity data into the second data-storage unit.

8. A storage apparatus comprising:
a first data-storage unit that stores parity data of user data of which writing is requested by a host device;
a second data-storage unit that stores the user data and the parity data; and
a controller that controls writing into the first data-storage unit and the second data-storage unit, and reading from the first data-storage unit and the second data-storage unit, a storage area in the second data-storage unit in which user data is stored having a first state and a second state, the first state being a state that user data stored in the storage area is protected by the parity data stored by the first data-storage unit, the second state being a state that user data stored in the storage area is not protected by the parity data stored by the first data-storage unit, wherein the controller comprises
a parity updating unit that updates the parity data when state of the storage area is changed, and writes first parity data into the first data-storage unit, the first parity data being the updated parity data, and
a parity writing unit that reads the parity data written in the first data-storage unit and writes second parity data into the second data-storage unit at a timing determined independently from the timing of updating of the parity data, the second parity data being the read parity data.

9. A computer program product having a non-transitory computer readable medium including programmed instructions, wherein when executed by a computer that controls writing into and reading from a first data-storage unit and a second data-storage unit included in a storage apparatus, the first data-storage unit storing parity data of user data of which writing is requested by a host device, and the second data-storage unit storing the user data and the parity data, a storage area in the second data-storage unit in which user data is stored having a first state and a second state, the first state being a state that user data stored in the storage area is protected by the parity data stored by the first data-storage unit, the second state being a state that user data stored in the storage area is not protected by the parity data stored by the first data-storage unit the instructions cause the computer to function as:
a parity updating unit that updates the parity data when state of the storage area is changed, and writes first parity data into the first data-storage unit, the first parity data being the updated parity data; and
a parity writing unit that reads the parity data written in the first data-storage unit and writes second parity data into the second data-storage unit at a timing determined independently from the timing of updating of the parity data, the second parity data being the read parity data.

* * * * *